US011392871B2

(12) United States Patent
Sakurai et al.

(10) Patent No.: US 11,392,871 B2
(45) Date of Patent: Jul. 19, 2022

(54) WORK SUPPORT DEVICE, WORK SUPPORT METHOD, AND WORK SUPPORT PROGRAM

(71) Applicant: Hitachi, Ltd., Tokyo (JP)

(72) Inventors: Yuichi Sakurai, Tokyo (JP); Yasuyuki Mimatsu, Tokyo (JP); Shigeyasu Tsubaki, Tokyo (JP); Kazuaki Suzuki, Tokyo (JP); Ryota Higashi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 83 days.

(21) Appl. No.: 16/899,701

(22) Filed: Jun. 12, 2020

(65) Prior Publication Data
US 2020/0401972 A1   Dec. 24, 2020

(30) Foreign Application Priority Data
Jun. 20, 2019 (JP) .............................. JP2019-114617

(51) Int. Cl.
*G06Q 10/06* (2012.01)
*G06T 7/00* (2017.01)

(52) U.S. Cl.
CPC ... *G06Q 10/06316* (2013.01); *G06Q 10/0633* (2013.01); *G06T 7/001* (2013.01); *G06T 7/0006* (2013.01)

(58) Field of Classification Search
CPC .......... G06Q 10/06316; G06Q 10/0633; G06T 7/0006; G06T 7/001
USPC ....................................................... 705/7.26
See application file for complete search history.

(56) References Cited

U.S. PATENT DOCUMENTS

| 2015/0246406 A1* | 9/2015 | Takayama | ................ B23K 9/32 |
| | | | 219/124.1 |
| 2016/0307459 A1* | 10/2016 | Chestnut | ................. G06F 3/011 |
| 2016/0358324 A1* | 12/2016 | Sugimoto | ........ G05B 19/41805 |
| 2017/0061212 A1* | 3/2017 | Tanaka | ................... G06V 20/20 |

(Continued)

FOREIGN PATENT DOCUMENTS

| JP | 2016-221671 | 12/2016 |
| JP | 2018-163556 | 10/2018 |

OTHER PUBLICATIONS

An Integrated Environment Based on Augmented Reality and Sensing Device for Manual Assembly Workstations. Michela Dalle Mura, Gino Dini, Franco Failli. Procedia CIRP, vol. 41, 2016, pp. 340-345.*

*Primary Examiner* — Timothy Padot
(74) *Attorney, Agent, or Firm* — Mattingly & Malur, PC

(57) ABSTRACT

The work support device stores information indicating a work order for each process, and information indicating a work area of a worker for each work in the process. A processor executes a specifying processing in which a target work to be performed by the worker is specified based on the information indicating the work order, a selection processing in which a target area where the target work specified by the specifying processing to be performed by the worker is selected based on the information indicating the work area, an identification processing in which a work performed by the worker is identified based on image data from a camera that captures an image of the area selected by the selection processing, a determination processing in which whether the worker has deviated from the work order is determined based on an identification result by the identification processing.

15 Claims, 19 Drawing Sheets

(56) References Cited

U.S. PATENT DOCUMENTS

2018/0065248 A1\* 3/2018 Barral ................ G05B 13/04
2019/0373164 A1\* 12/2019 Okada ................ H04N 7/183

\* cited by examiner

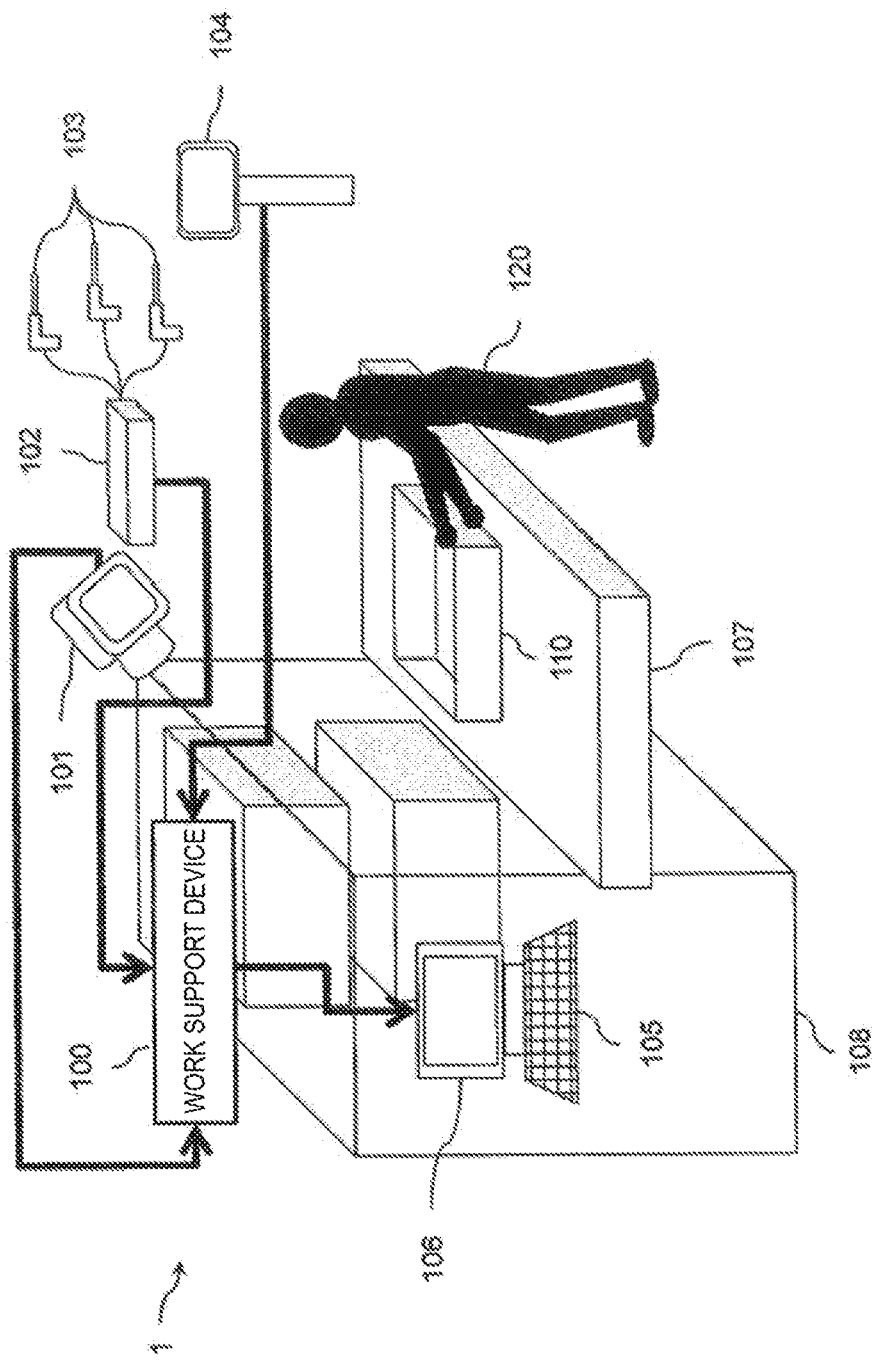
[FIG. 1]

[FIG. 2]
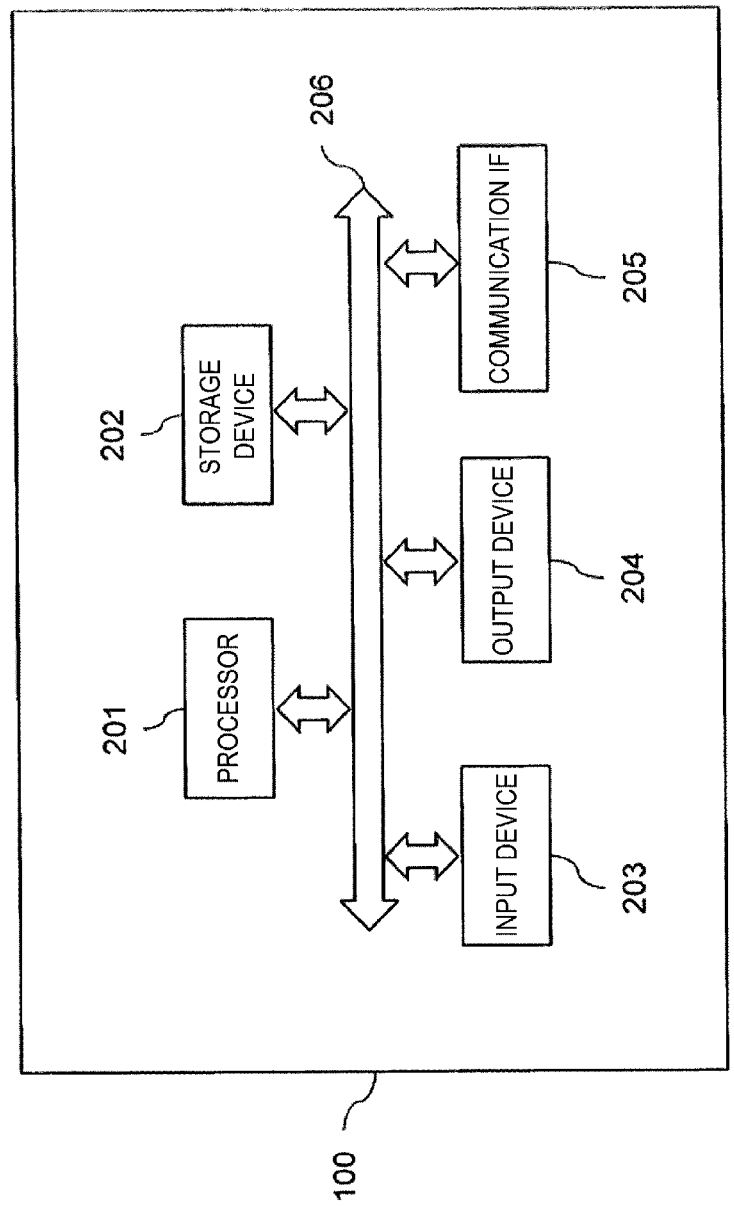

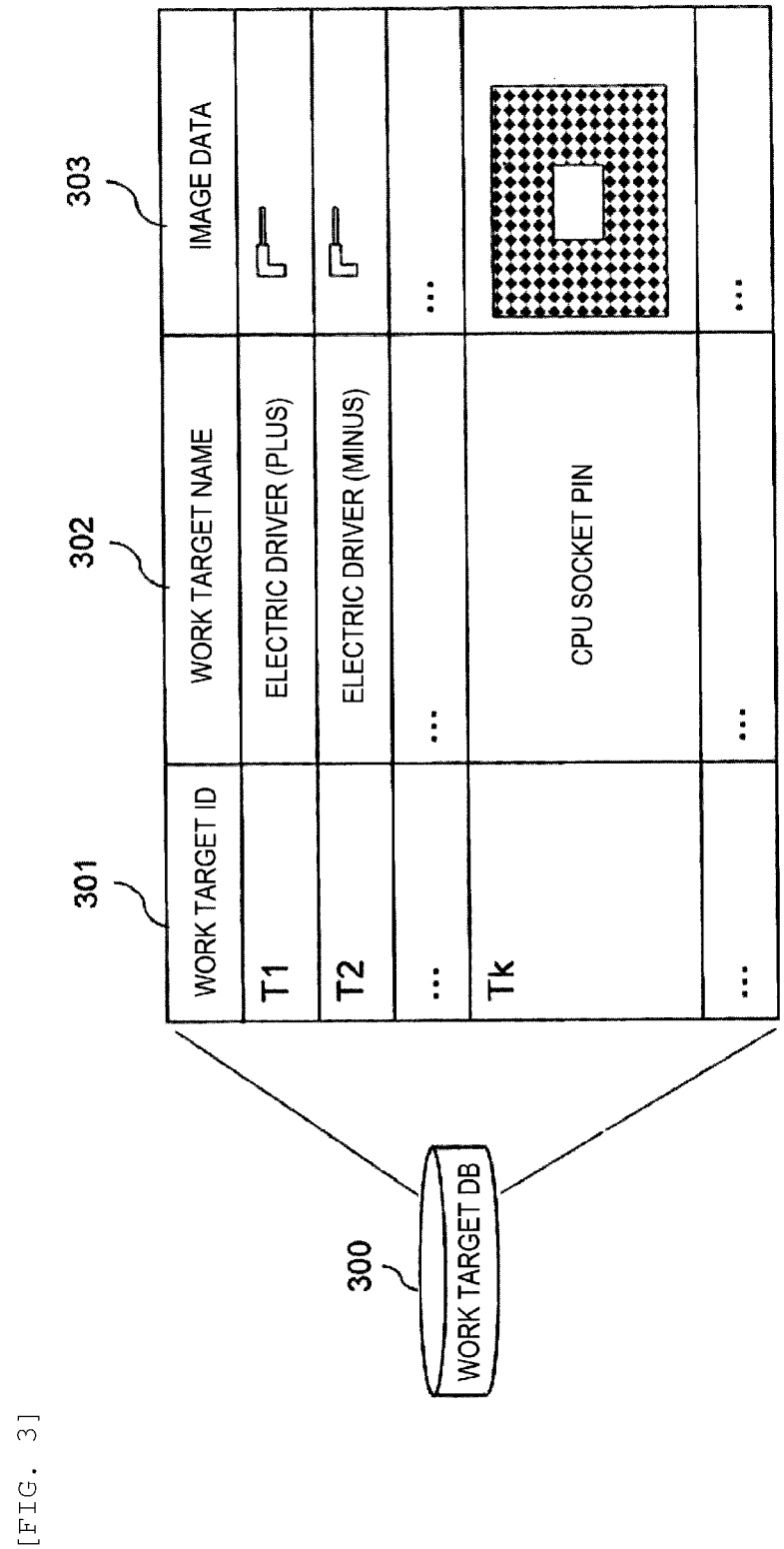
[FIG. 3]

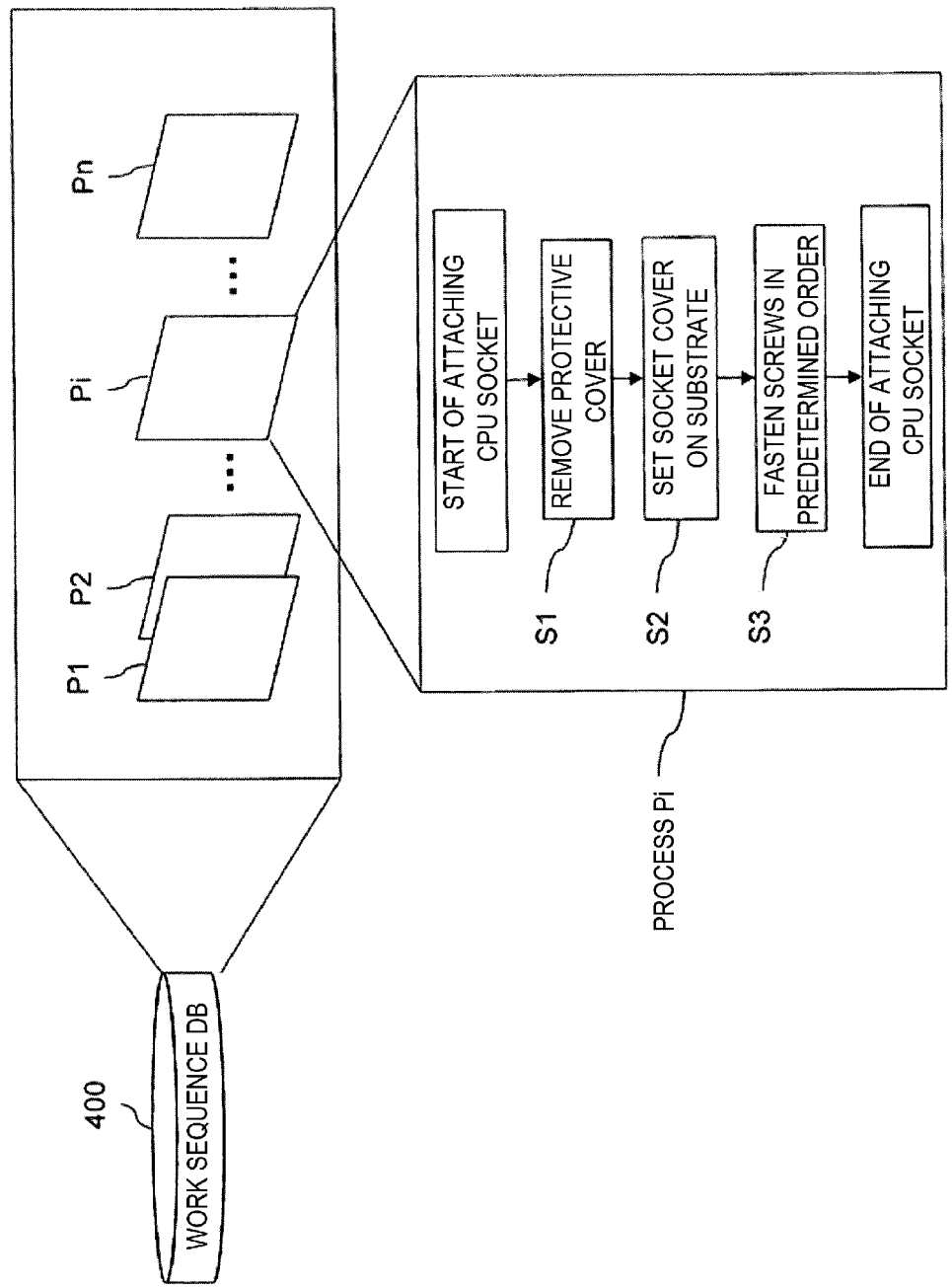

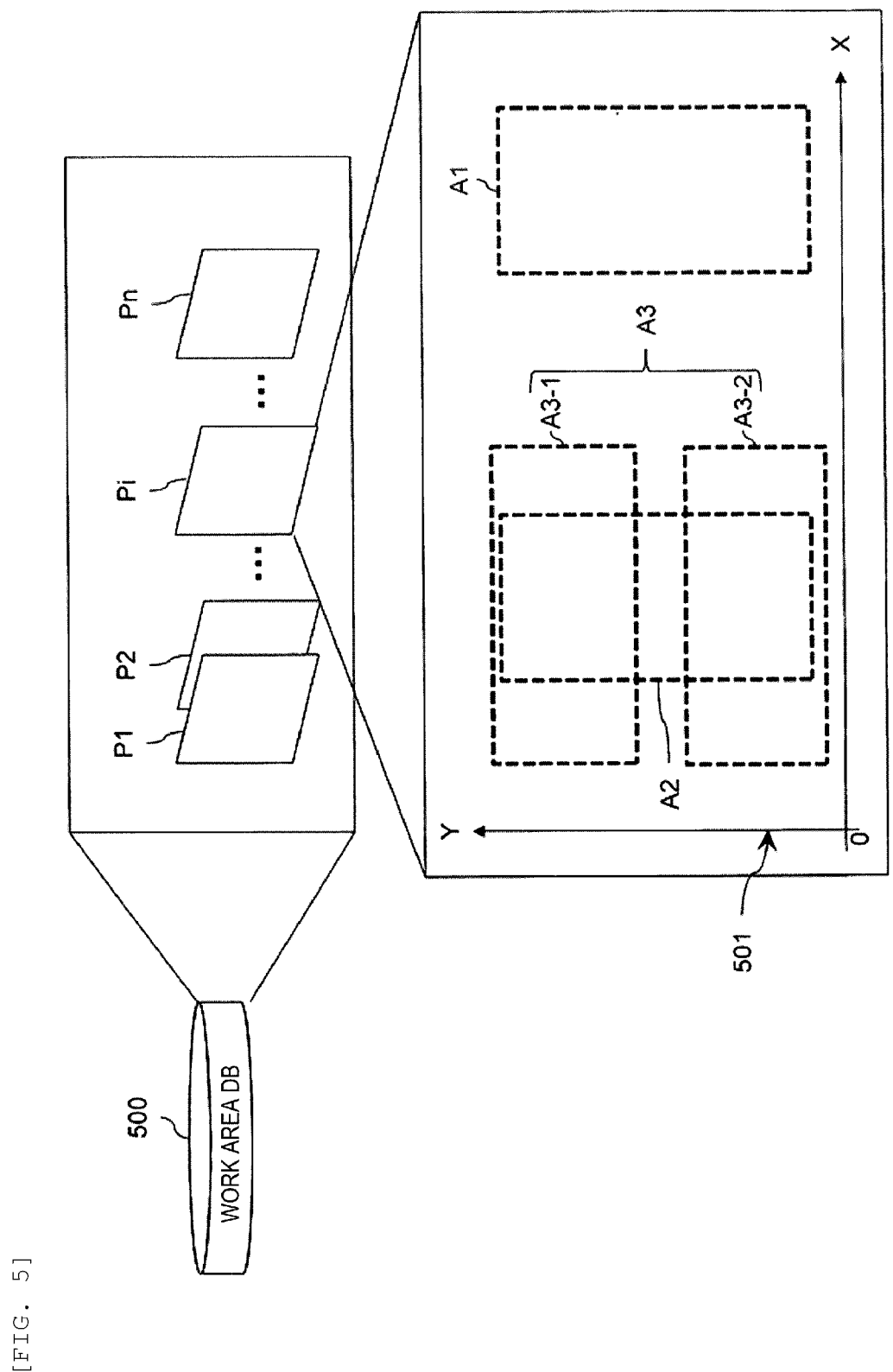

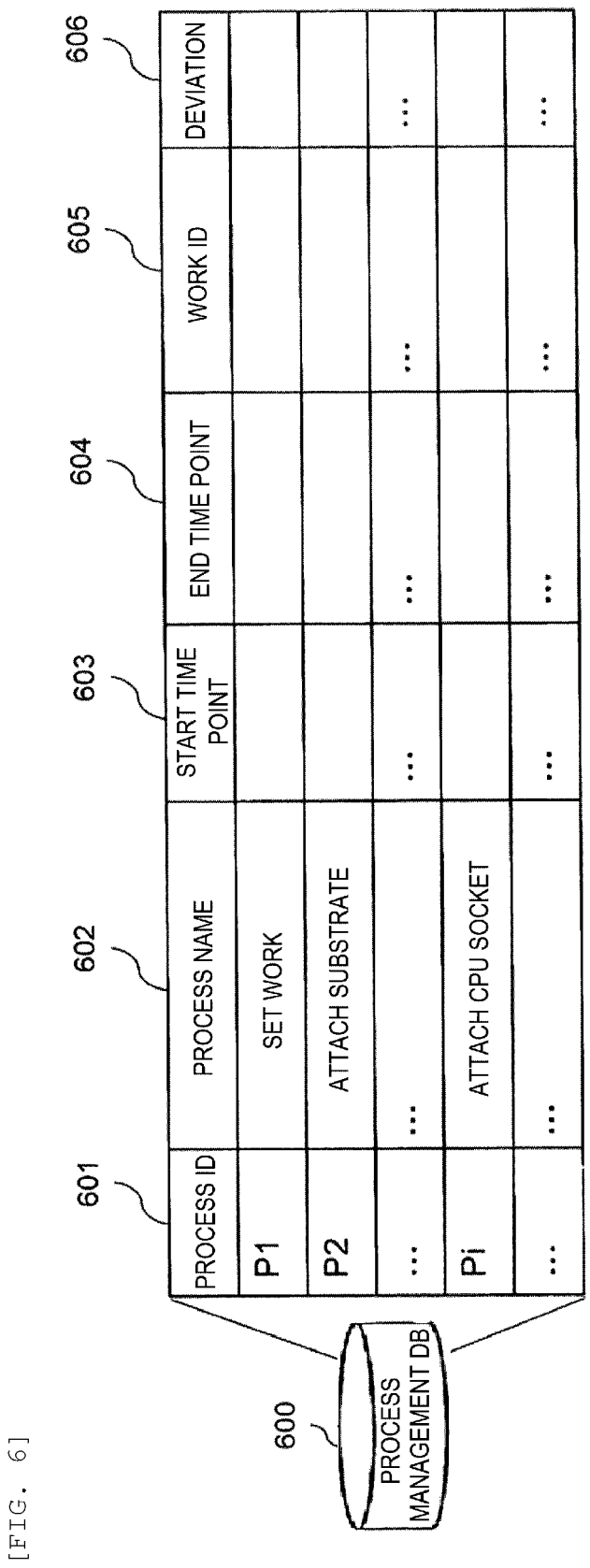
[FIG. 6]

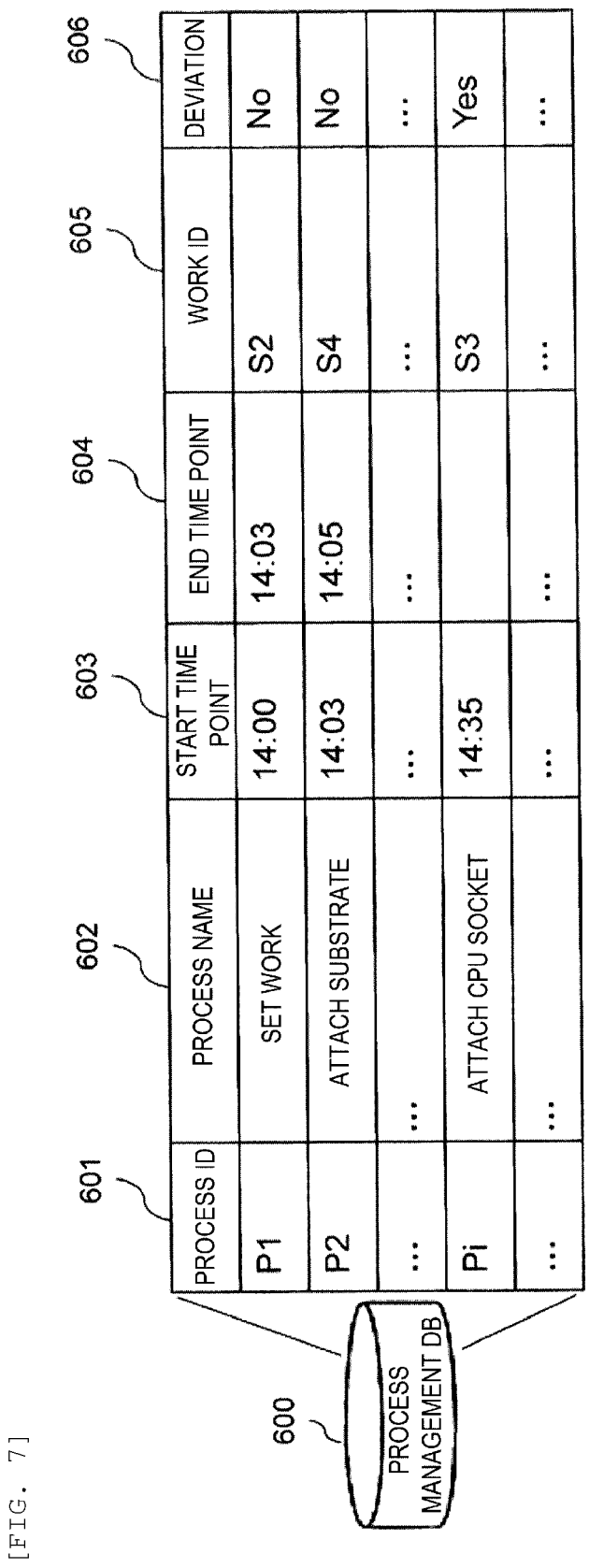
[FIG. 7]

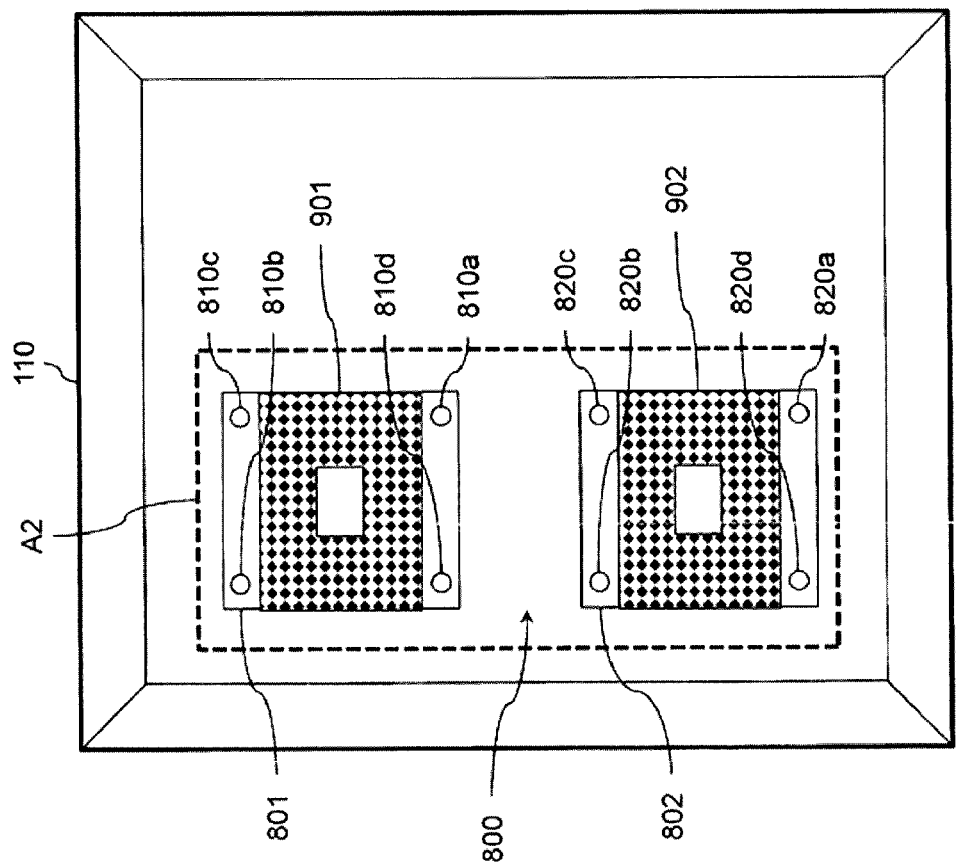
[FIG. 8]

[FIG. 9]
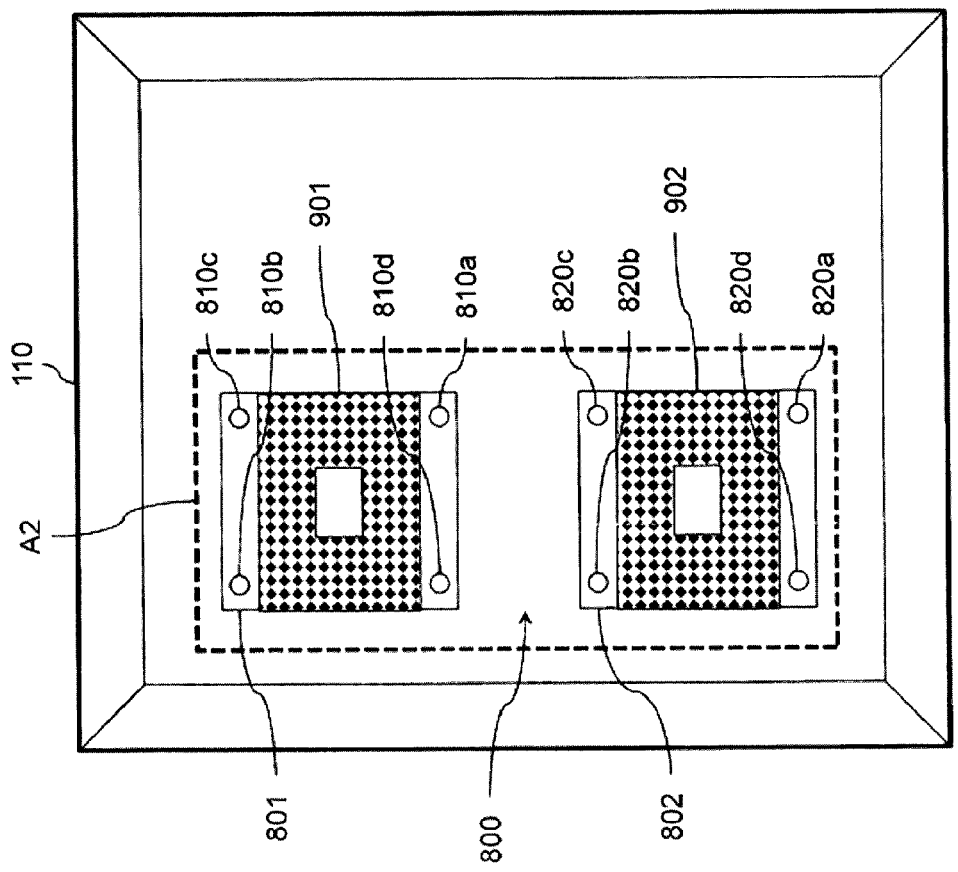

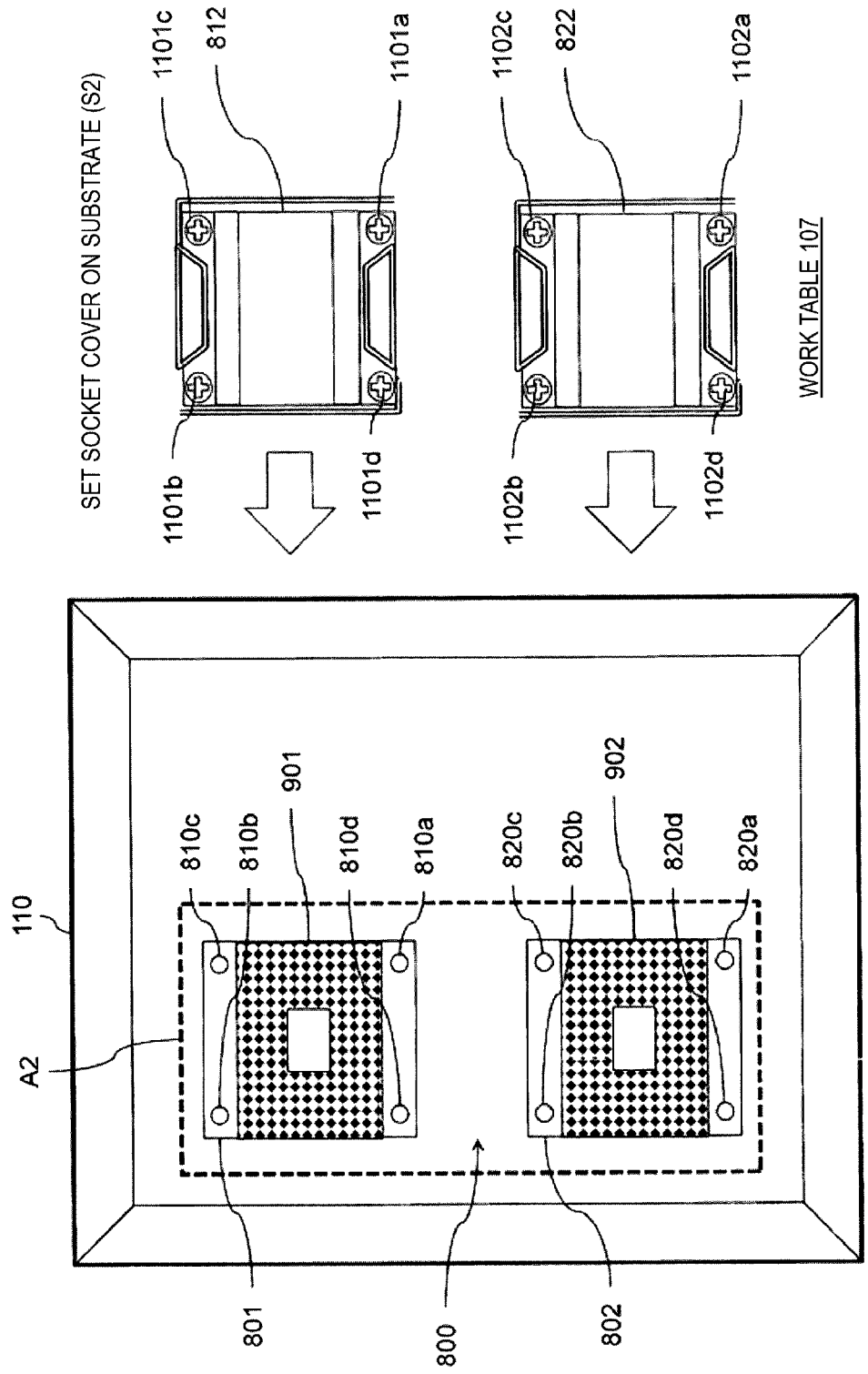
[FIG. 10]

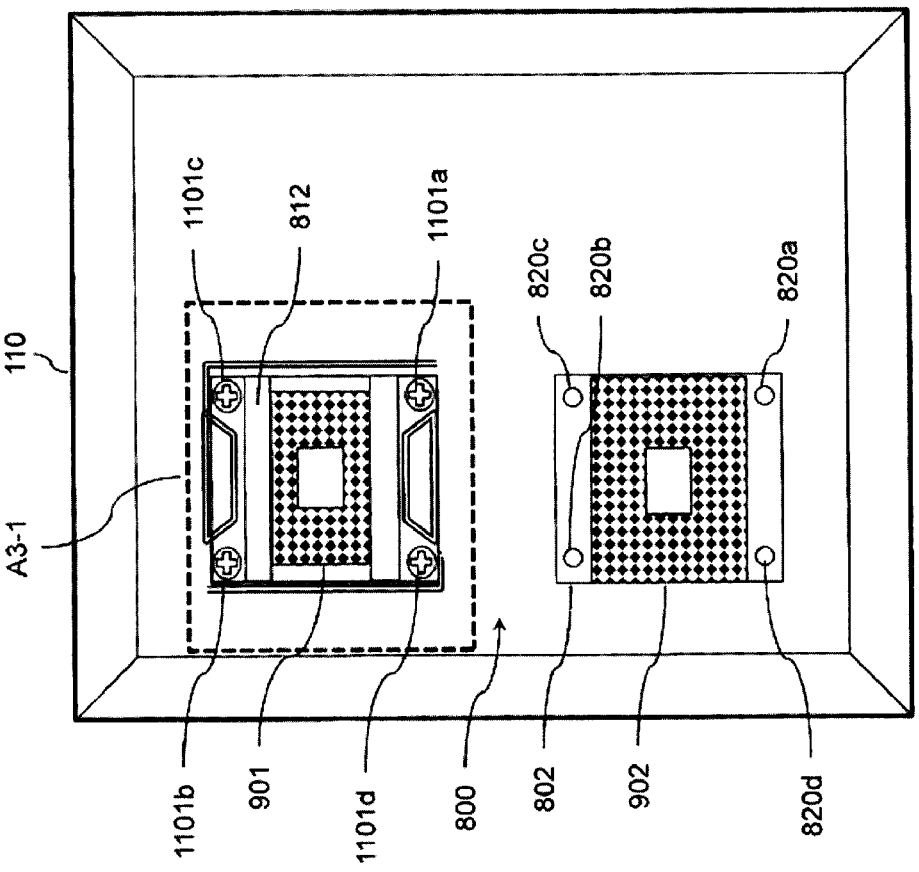

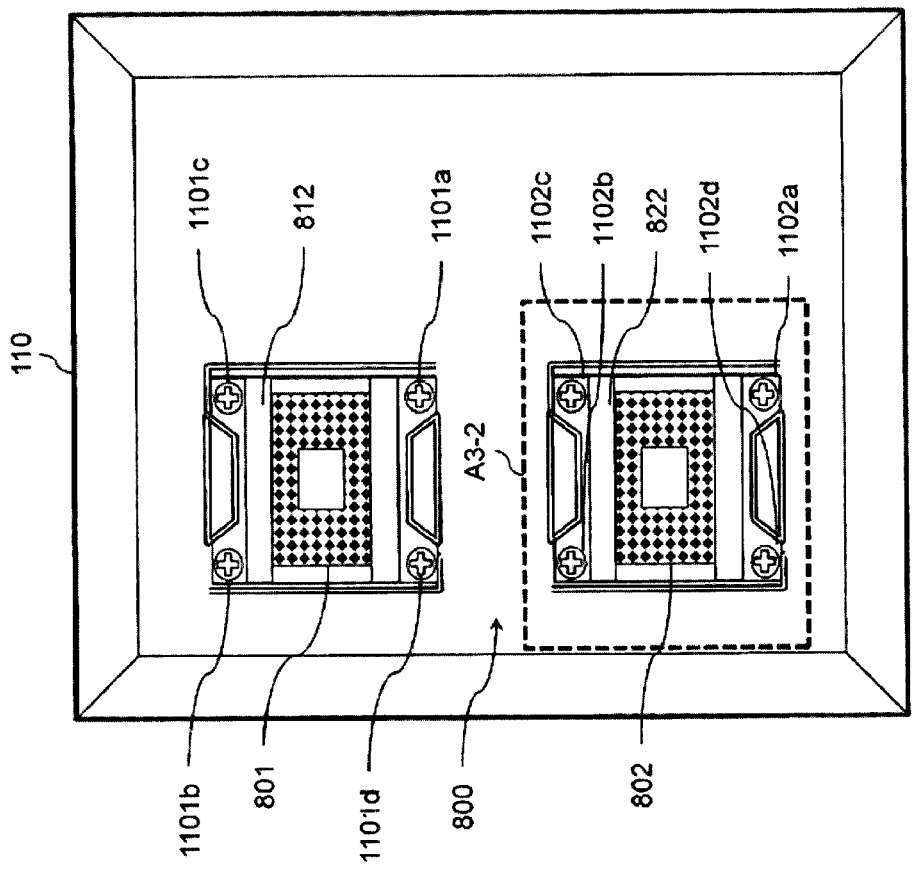
[FIG. 12]

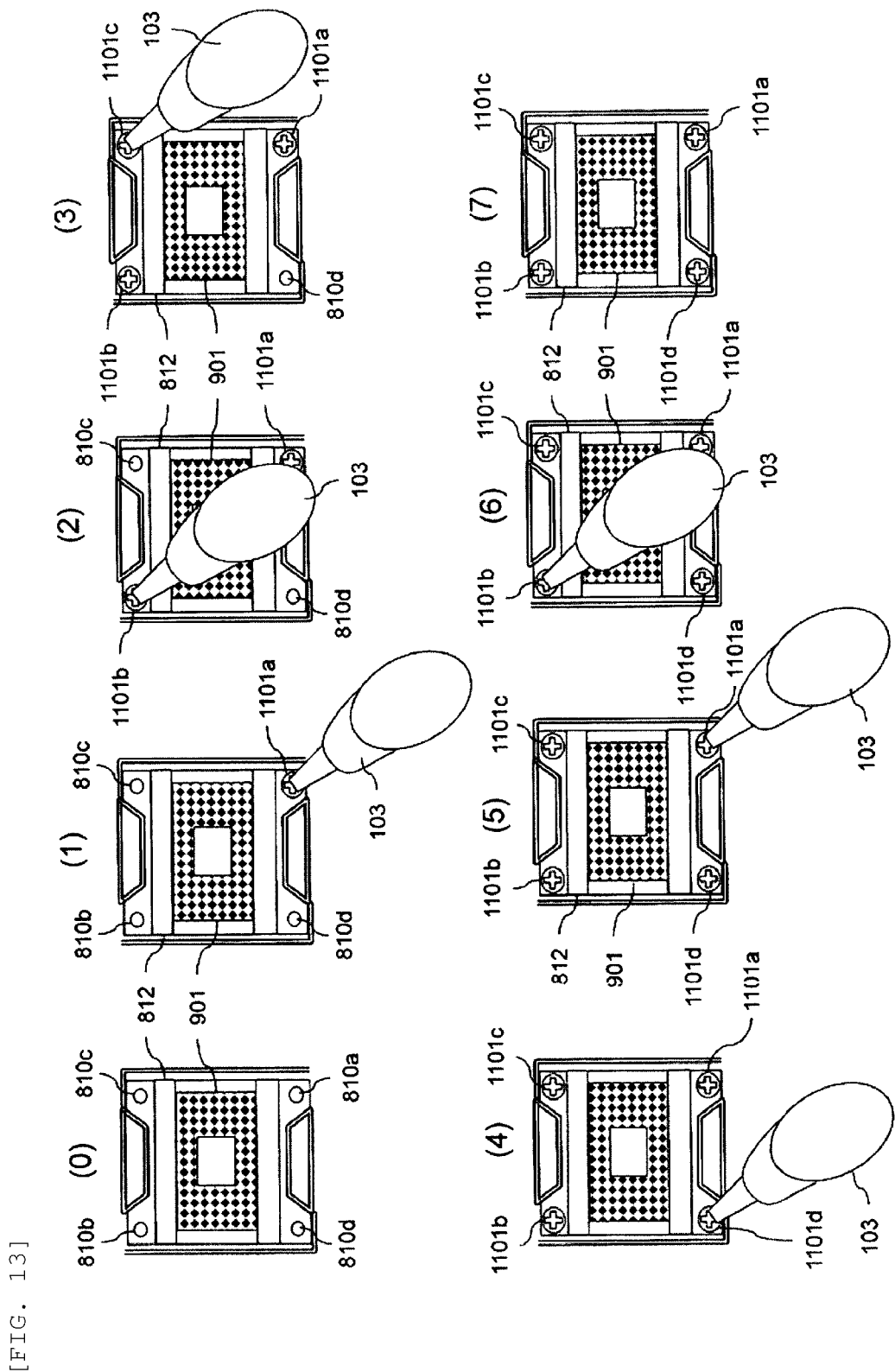
[FIG. 13]

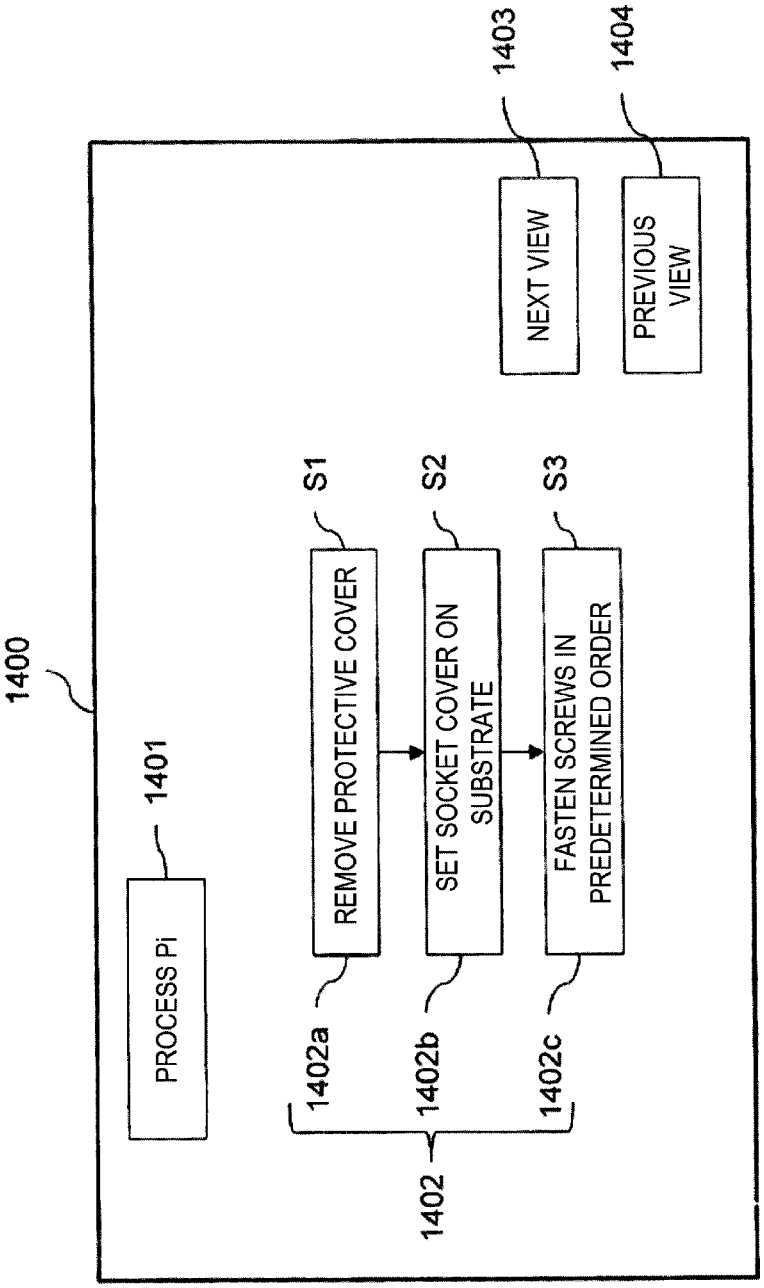

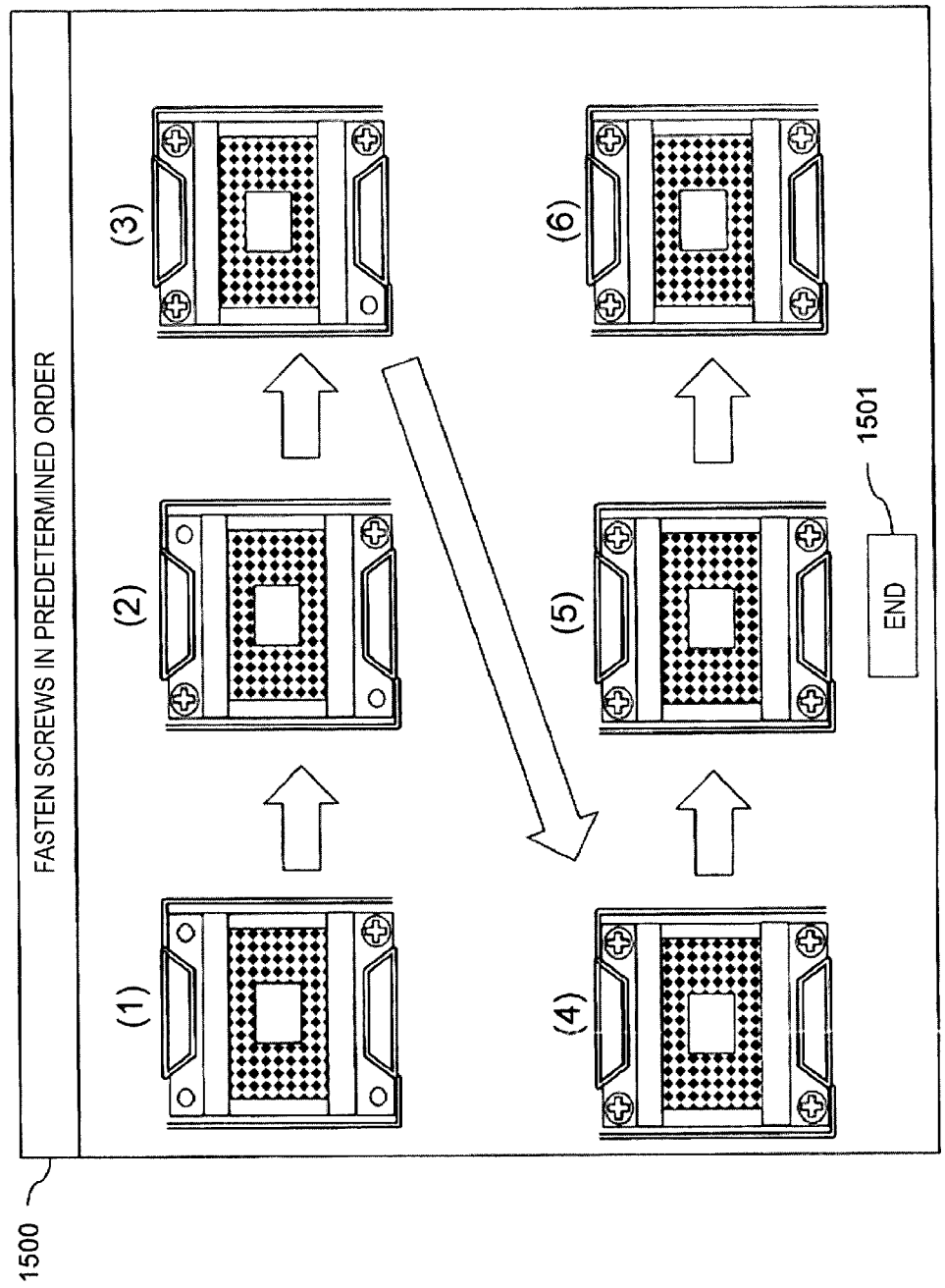
[FIG. 15]

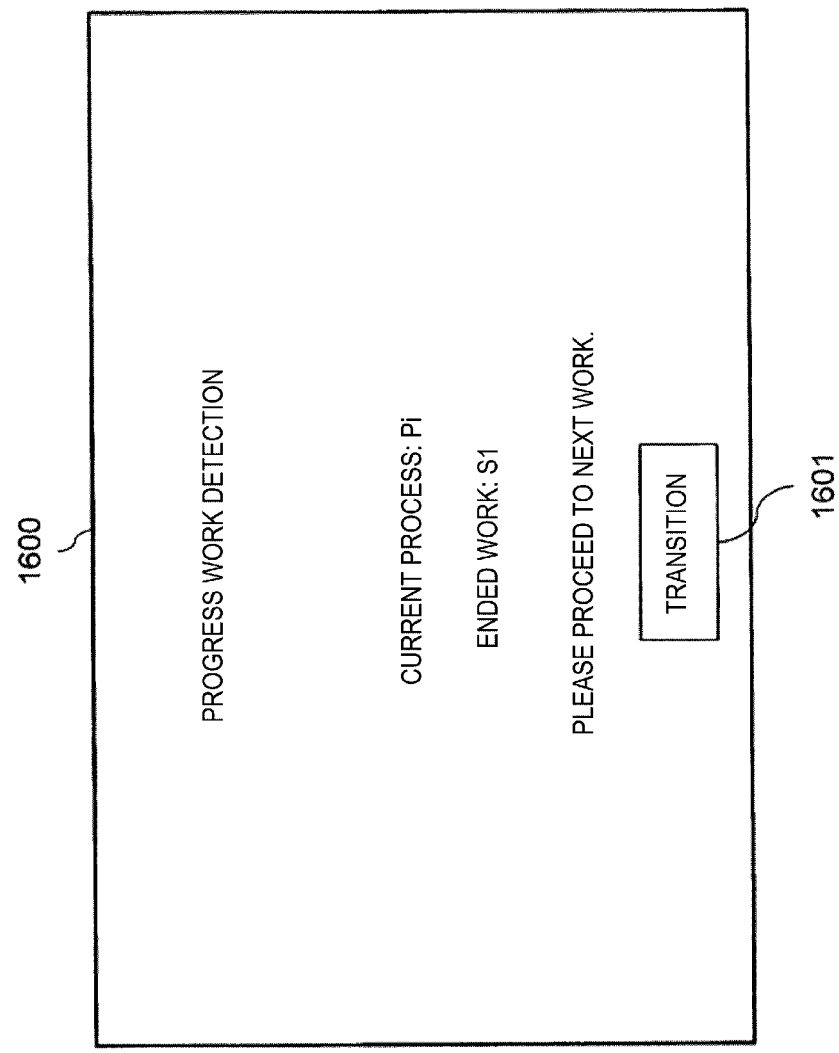

[FIG. 17]
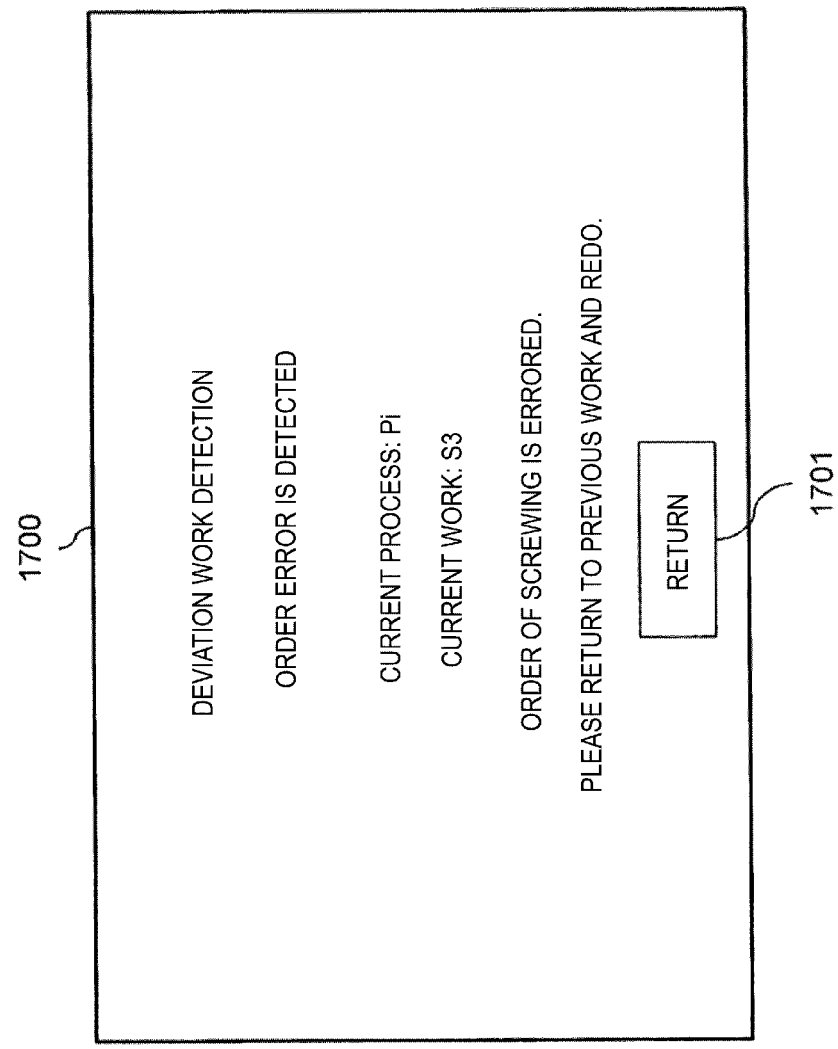

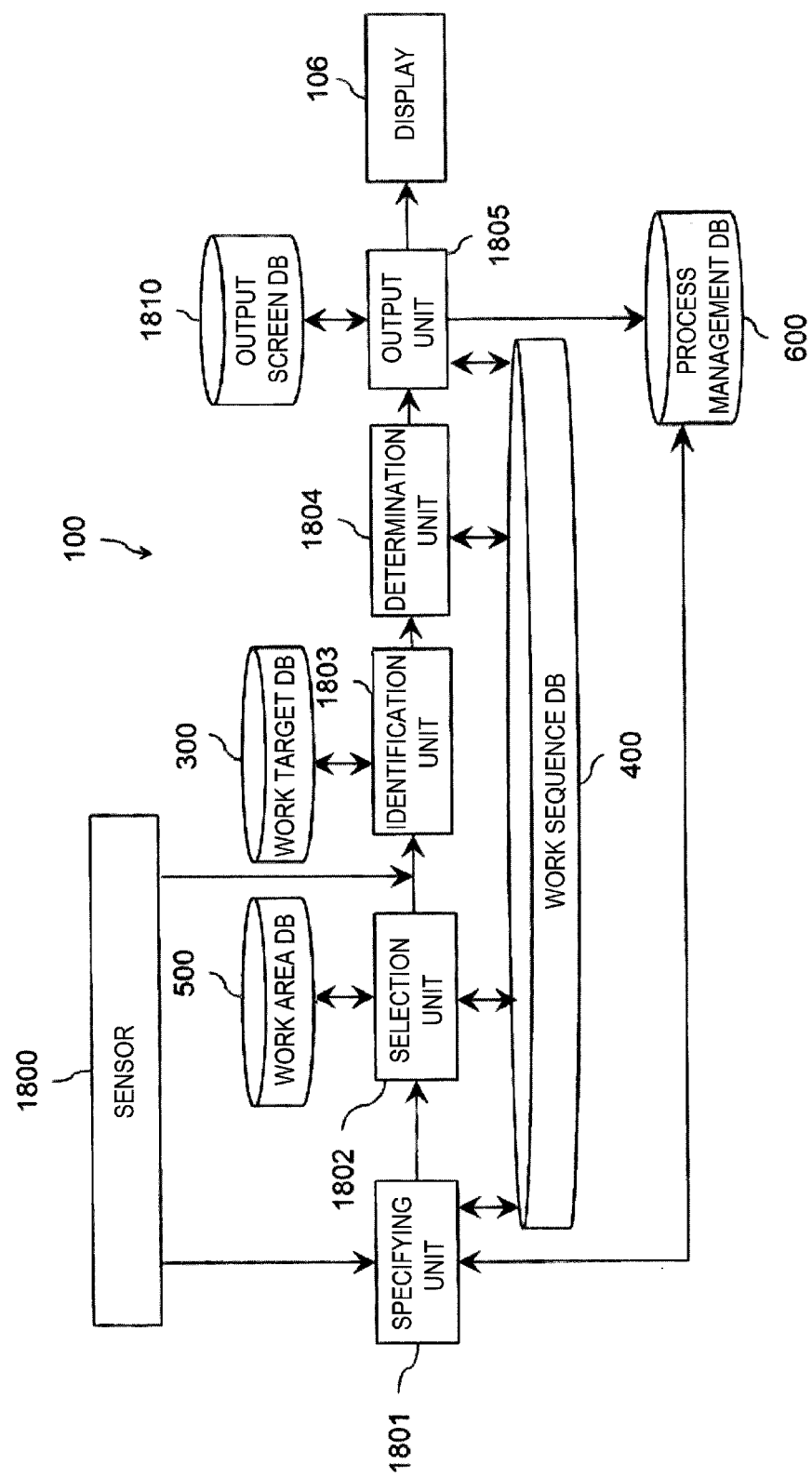
[FIG. 18]

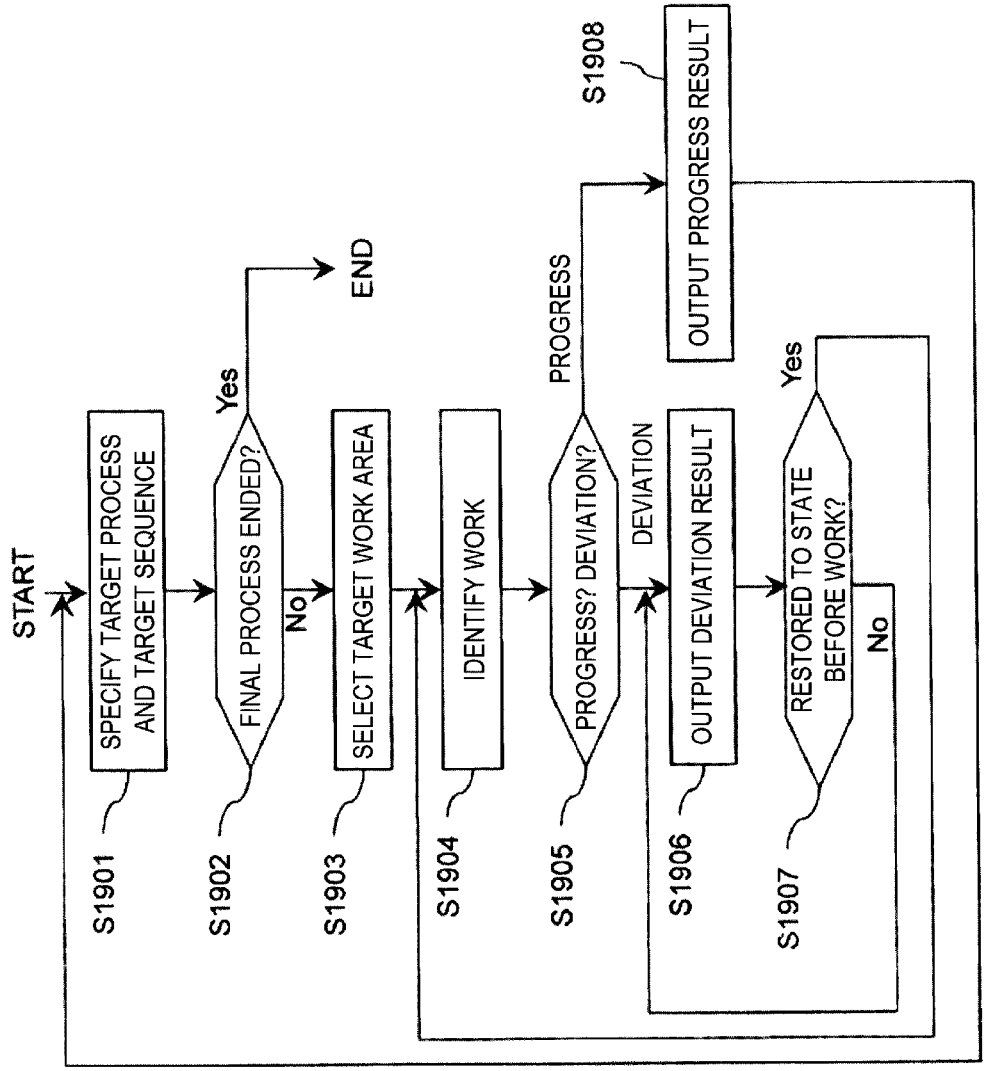
[FIG. 19]

WORK SUPPORT DEVICE, WORK SUPPORT METHOD, AND WORK SUPPORT PROGRAM

CLAIM OF PRIORITY

The present application claims priority from Japanese patent application JP 2019-114617 filed on Jun. 20, 2019, the content of which is hereby incorporated by reference into this application.

TECHNICAL FIELD

The present invention relates to a work support device, a work support method, and a work support program for supporting work performed by a worker.

BACKGROUND ART

PTL 1 discloses a work management device that grasps and manages a progress of work by a worker without registering the progress. The work management device includes: a sensor that detects an operation of the worker; a feature amount extraction unit that extracts a feature amount of the operation detected by the sensor; a database that associates the feature amount of the operation with the work and standard time of the work; a work identification unit that identifies the work performed by the worker based on the feature amount of the operation extracted by the feature amount extraction unit with reference to the database; and a work progress estimation unit that estimates the progress of the work in accordance with the work identified by the work identification unit and the standard time registered in the database.

PTL 2 discloses a work instruction system that outputs a material such as a work instruction corresponding to a work process to be performed. The work instruction system includes an image processing device for imaging a subject and an output device connected to the image processing device. The work instruction system images the subject and generates image data, acquires determination data corresponding to the work process performed on the subject, inputs document data indicating the work process, determines whether the subject includes a state or an object indicated by the determination data based on the image data and the determination data, and outputs document data corresponding to the work process specified by the determination.

CITATION LIST

Patent Literature

PTL 1: JP-A-2018-163556
PTL 2: JP-A-2016-221671

SUMMARY OF INVENTION

Technical Problem

However, in a case of the work management device of PTL 1, there is a problem that identification accuracy of the operation of the worker is deteriorated due to change in skeletons for each worker (difference in feature amount) in a case of different workers or a difference (variation in the operation feature amount) in a moving way of an arm day by day even for the same worker.

The work instruction system of PTL 2 cannot determine work by a person when a state of the subject does not change, for example, when a screw is tightened, and a problem exists that the identification accuracy of the operation of the worker is deteriorated.

In this manner, in PTLs 1 and 2, accuracy of human work identification is reduced due to individual differences in feature amount and differences in workdays by simply imaging an entire work table or all workers with a camera and performing identification by image recognition only.

An object of the invention is to solve the above-described problems in the related arts, and to improve identification accuracy of work performed by a worker.

Solution to Problem

A work support device according to an aspect of the invention disclosed in the present application includes a processor that executes a program, and a storage device that stores the program. The storage device or another storage device accessible by the work support device stores information indicating a work order for each process, and information indicating a work area of a worker for each work in the process. The processor executes a specifying processing in which a target work to be performed by the worker is specified based on the information indicating the work order, a selection processing in which a target area where the target work specified by the specifying processing to be performed by the worker is selected based on the information indicating the work area, an identification processing in which a work performed by the worker is identified based on image data from a camera that captures an image of the area selected by the selection processing, a determination processing in which whether the worker has deviated from the work order is determined based on an identification result by the identification processing, and an output processing in which a determination result by the determination processing is output.

Advantageous Effect

According to a representative embodiment of the invention, the identification accuracy of the work performed by the worker can be improved. Problems, configurations and effects other than those described above will be clarified by the description of following embodiments.

BRIEF DESCRIPTION OF DRAWINGS

FIG. 1 is an explanatory diagram showing a system configuration example of a work supporting system.

FIG. 2 is a block diagram showing a hardware configuration example of a work support device.

FIG. 3 is an explanatory diagram showing a storage content example of a work target DB.

FIG. 4 is an explanatory diagram showing a storage content example of a work sequence DB.

FIG. 5 is an explanatory diagram showing a storage content example of a work area DB.

FIG. 6 is an explanatory diagram showing a storage content example of a process management DB.

FIG. 7 is an explanatory diagram showing an update state of the process management DB.

FIG. 8 is an explanatory diagram showing a state at the start of work S1 in a process Pi.

FIG. 9 is an explanatory diagram showing a state at the end of the work S1 in the process Pi.

FIG. 10 is an explanatory diagram showing work S2 in the process Pi.

FIG. 11 is an explanatory diagram showing a state of work S3 during operation in the process Pi.

FIG. 12 is an explanatory diagram showing a state at the end of the work S3 in the process Pi.

FIG. 13 is an explanatory diagram showing a predetermined order of the work S3 in a work area A3-1 in the process Pi.

FIG. 14 is an explanatory diagram showing an example of an output screen displaying a work order of the process Pi.

FIG. 15 is an explanatory diagram showing an example of an output screen displayed when the worker selects a third item by an input device.

FIG. 16 is an explanatory diagram showing an example of an output screen showing progress work detection.

FIG. 17 is an explanatory diagram showing an example of an output screen showing deviation work detection.

FIG. 18 is a block diagram showing a functional configuration example of the work support device.

FIG. 19 is a flowchart showing an example of a procedure of a work support processing performed by the work support device.

DESCRIPTION OF EMBODIMENTS

Configuration Example of Work Supporting System

FIG. 1 is an explanatory diagram showing a system configuration example of a work supporting system. A work supporting system 1 includes a work support device 100, a camera 101, a driver counter 102, electric drivers 103, a reading device 104, a keyboard 105, and a display 106.

The work support device 100 is a computer that supports work performed by a worker 120. The work support device 100 is placed on a work shelf 108. The camera 101 is connected to the work support device 100, captures an image of a work table 107, and outputs image data of the captured image to the work support device 100. The driver counter 102 is connected to the work support device 100, counts the number of times of use for each electric driver 103, and outputs a counting result to the work support device 100. The electric driver 103 is an electric tool that tightens and loosens a screw electrically.

The electric driver 103 is connected to the driver counter 102 and outputs a signal indicating a rotation direction when a screw is rotated to the driver counter 102. Accordingly, the driver counter 102 can count the number of times of tightening and the number of times of loosening for each electric driver 103. Although the work supporting system 1 includes the driver counter 102 and the electric driver 103, the work supporting system 1 may be a non-electric driver.

The reading device 104 is connected to the work support device 100, reads a code attached to a housing 110 which is one of work targets, and outputs a number string embedded in the code to the work support device 100. The reading device 104 may be a bar code reader that reads a bar code or a two-dimensional code reader that reads a two-dimensional code. The keyboard 105 is connected to the work support device 100, and is a device for the worker 120 to input a character to the work support device 100 or select an item in the work support device 100. A touch panel may be used instead of the keyboard 105. The display 106 is connected to the work support device 100 and displays a screen based on data from the work support device 100.

The worker 120 places the housing 110 on the work table 107 in a state of being imaged by the camera 101, and performs work using the electric driver 103 and the reading device 104. In the present embodiment, an assembly work of a server as the work target will be described as an example.

Hardware Configuration Example of Work Support Device 100

FIG. 2 is a block diagram showing a hardware configuration example of the work support device 100. The work support device 100 includes a processor 201, a storage device 202, an input device 203, an output device 204, and a communication interface (communication IF) 205. The processor 201, the storage device 202, the input device 203, the output device 204 and the communication IF 205 are connected via a bus 206. The processor 201 controls the work support device 100. The storage device 202 is a work area of the processor 201. The storage device 202 is a non-temporary or temporary recording medium that stores various programs and data. The storage device 202, for example, maybe a read-only memory (ROM), a random access memory (RAM), a hard disk drive (HDD) or a flash memory. The input device 203 inputs data. The input device 203 includes, for example, the keyboard 105, a mouse, a touch panel, a numeric keypad, a scanner, the camera 101, the driver counter 102, and the reading device 104. The output device 204 outputs data. The output device 204 is, for example, the display 106 or a printer. The communication IF 205 is connected to a network and transmits and receives data.

Database

Next, a work target DB, a work sequence DB, a work area DB, and a process management DB of the work support device 100 will be described. At least one of the databases may be stored not in the work support device 100 but in another computer accessible by the work support device 100.

FIG. 3 is an explanatory diagram showing a storage content example of a work target DB 300. The work target DB 300 is a database that stores information relating to a tool. The work target DB 300 includes, as fields, a work target ID 301, a work target name 302, and image data 303. Values of fields in the same line constitute an entry of a tool.

The work target ID 301 is identification information for uniquely specifying a work target. The work target includes a CPU socket to be worked by the worker 120, an article such as a component thereof, and a tool used by the worker 120 for work. The tool is, for example, the above-described electric driver 103 or the reading device 104. The work target name 302 is a name of the work target specified by the work target ID 301. The image data 303 is image data of the work target specified by the work target ID 301. The image data 303 may be a plurality of pieces of image data obtained by imaging the work target from different directions, such as a front view and a side view. The image data 303 may be a three-dimensional model.

FIG. 4 is an explanatory diagram showing a storage content example of a work sequence DB 400. The work sequence DB 400 is a database that stores information indicating a work order for each process performed by the worker 120. The work sequence DB 400 stores a series of work processes (hereinafter, simply referred to as processes) P1, P2, . . . , Pi, . . . , Pn (n is an integer which is equal to or more than 1. i meets 1≤i≤n.). It is necessary for the worker 120 to perform work in an order of the processes P1, P2, . . . , Pi, . . . , Pn.

The process Pi indicates, for example, a series of works for attaching the CPU socket to a substrate (motherboard). The process Pi includes assembly drawing information indicating a work order of removing a protective cover (S1), setting a CPU socket cover on the substrate (S2), and fastening screws in a predetermined order (S3). The process Pi is a process of attaching the CPU socket to the substrate (motherboard) in the work order of removing the protective cover (S1), setting the socket cover on the substrate (S2), and fastening the screws in the predetermined order (S3).

Removing the protective cover (S1) is, for example, a work of removing protective covers from two protective covers and two socket covers (hereinafter, cover member group) and extracting the socket covers. Setting the socket cover on the substrate (S2) is a work of mounting the two socket covers extracted in the work S1 to corresponding mounting positions on the substrate. A CPU socket pin is already attached to each mounting position. Fastening the screws in the predetermined order (S3) is a work of screwing the socket covers in the predetermined order to each CPU socket pin mounted in the mounting position, and fixing the CPU socket pins to the substrate.

FIG. 5 is an explanatory diagram showing a storage content example of a work area DB 500. The work area DB 500 is a database that stores information relating to a work area that is an area where the worker 120 works for each work in the process Pi. The work area DB 500 stores a work area for each of the processes P1, P2, . . . Pi, . . . , Pn. It is necessary for the worker 120 to perform work in the work area for each of the processes P1, P2, . . . Pi, . . . , Pn.

Work areas A1 to A3 corresponding to the works S1 to S3 in the process Pi will be described as an example. A work area Aj (j is a number) is an area where work Sj is performed. The work areas A1 to A3 are specified by coordinate positions on a plane coordinate 501 of the work table 107. The work area A1 is an area where the worker 120 performs the work S1 of removing the protective covers from the cover member group (the socket covers and the protective covers).

The work area A2 is an area where the worker 120 performs the work S2 of setting the two socket covers on the substrate respectively. The work area A3 is an area where the worker 120 performs the work S3 of screwing the socket covers to the substrate on each of the CPU socket pins. The work area A3 includes work areas A3-1 and A3-2. The work area A3-1 is for a work of screwing a socket cover to the substrate on a first CPU socket pin, and the work area A3-2 is for a work of screwing a socket cover to the substrate on a second CPU socket pin.

FIG. 6 is an explanatory diagram showing a storage content example of a process management DB 600. The process management DB 600 is a database for managing the processes P1, P2, . . . Pi, . . . , Pn. The process management DB 600 includes, as fields, a process ID 601, a process name 602, a start time point 603, an end time point 604, a work ID 605, and a deviation 606. Values of fields in the same line constitute an entry of the process Pi.

The process ID 601 is identification information for uniquely specifying the process Pi. The process name 602 is a name of the process Pi specified by the process ID 601. The start time point 603 is a time point at which the process Pi specified by the process ID 601 is started. The start time point 603 is not recorded before the start of the process Pi. The end time point 604 is a time point at which the process Pi specified by the process ID 601 is ended. The end time point 604 is not recorded before the end of the process Pi. The work ID 605 is identification information for uniquely specifying the work Sj currently being performed in the process Pi specified by the process ID 601.

The deviation 606 is information indicating whether the work Sj specified by the work ID 605 has deviated from the work order. A case of "Yes" indicates that the work order has deviated, and a case of "No" indicates that the work order has progressed. The deviation of the work order is, for example, an error in the work order between works Sj, for example, skipping the work S2 and executing the work S3 although the worker 120 should execute the work S2, or an error in a work order defined in one work Sj, for example, an error in a screw fastening order in the work S3.

FIG. 7 is an explanatory diagram showing an update state of the process management DB 600. The start time point 603 and the end time point 604 are recorded since the processes P1 and P2 have been ended. In the work ID 605, S2 and S4 are recorded as the work ID 605 of the final work of each of the processes P1 and P2. The processes P1 and P2 have ended normally. Accordingly, the final works S2 and S4 specified by the work ID 605 do not deviate from the work order and "No" is recorded in the deviation 606.

The process Pi is a work process currently being performed. "14:35" in the start time point 603 is the time point at which the process Pi (that is, the work S1) is started. The end time point 604 is not recorded since the process Pi has not yet ended. "S3" is recorded in the work ID 605, and it can be understood that the work currently being performed is the work S3. "Yes" is recorded in the deviation 606, and it can be understood that a deviation exists in the work order in the work S3.

Work Order Example of Process Pi

Next, the work order example of the process Pi performed by the worker 120 will be described with reference to FIGS. 8 to 14.

FIG. 8 is an explanatory diagram showing a state at the start of the work S1 in the process Pi. The housing 110 is placed on the work table 107, and a substrate 800 is attached to the inside of the housing 110. On the substrate 800, CPU socket pins 901 and 902 are attached to mounting positions 801 and 802. Screw holes 810a to 810d are formed at four corners of the mounting position 801, and screw holes 820a to 820d are formed at four corners of the mounting position 802. The work area A1 is aright side of the housing 110, and two cover member groups 811 and 821 are placed therein.

The cover member group 811 includes a socket cover 812 and a protective cover 813, and the cover member group 821 includes a socket cover 822 and a protective cover 823. The socket covers 812 and 822 are metal members that fix CPU components to the substrate 800. The CPU components are mounted on the CPU socket pins 901 and 902 (not shown) mounted on the substrate 800 in the next process. The protective covers 813 and 823 are resin covers that prevent the socket covers 812 and 822 from being damaged.

When two cover member groups 811 and 821 are detected as subjects in the work area A1 by image data from the camera 101, the work support device 100 determines that the work S1 in the process Pi is started, and records the detection time point in the start time point 603 in the entry of the process Pi of the process management DB 600.

FIG. 9 is an explanatory diagram showing a state at the end of the work S1 in the process Pi. When the protective covers 813 and 823 are removed from the cover member groups 811 and 821, the socket cover 812 and 822 are taken out. In this state, the work of the process Pi progresses from the work S1 to the work S2.

The deviation of the work S1 is not limited to comparison of image data before and after removal of the protective covers in FIGS. 8 and 9. The work support device 100 determines the deviation of the work S1 in consideration of a series of work operations such as a movement of a hand of the worker 120 during removal of the protective covers being imaged by the camera 101 and presence or absence of a removed part.

FIG. 10 is an explanatory diagram showing the work S2 in the process Pi. The worker 120 attaches the socket cover 812 taken out in the work S1 to the mounting position 801 in the work area A2, and attaches the socket cover 822 to the mounting position 802. Specifically, for example, the worker 120 removes four screws 1101a to 1101d from the socket cover 812 and four screws 1102a to 1102d from the socket cover 822 using the electric driver 103, places the screws 1101a to 1101d on the mounting position 801 to cover the CPU socket pin 901, and places the screws 1102a to 1102d on the mounting position 802 to cover the CPU socket pin 902. Accordingly, the work of the process Pi progresses from the work S2 to the work S3.

FIG. 11 is an explanatory diagram showing a state of the work S3 being performed in the process Pi. FIG. 11 shows a state in which the socket cover 812 is attached to the substrate 800 in the work area A3-1, the CPU socket pin 901 is fixed to the substrate 800, and the socket cover 822 is not yet attached to the work area A3-2. The socket cover 812 is fastened by screwing the four screws 1101a to 1101d into the screw holes 810a to 810d of the substrate 800 that communicate with holes (not shown) of the socket cover 812.

The fastening of the four screws 1101a to 1101d has a predetermined order, and when the fastening is not performed in the predetermined order, the work support device 100 determines that the work S3 has deviated from the work order. In this case, the work support device 100 records "Yes" in the deviation in the entry of the process Pi of the process management DB 600. It is necessary for the worker 120 to return to the state before the deviation. When the state before the deviation is restored according to the image data from the camera 101, the work support device 100 instructs the worker 120 to execute the work S3 again.

FIG. 12 is an explanatory diagram showing a state at the end of the work S3 in the process Pi. FIG. 12 shows a state in which the socket cover 812 is attached to the substrate 800 in the work area A3-1, the CPU socket pin 901 is fixed to the substrate 800, the socket cover 822 is attached to the substrate 800 in the work area A3-2, and the CPU socket pin 902 is fixed to the substrate 800. The socket cover 822 is fastened by screwing the four screws 1102a to 1102d into the screw holes 820a to 820d of the substrate 800 that communicate with holes (not shown) of the socket cover 822.

The fastening of the four screws 1102a to 1102d has a predetermined order, and when the fastening is not performed in the predetermined order, the work support device 100 determines that the work S3 has deviated from the work order. In this case, the work support device 100 records "Yes" in the deviation 606 in the entry of the process Pi of the process management DB 600. It is necessary for the worker 120 to return to the state before the deviation. When the state before the deviation is restored according to the image data from the camera 101, the work support device 100 instructs the worker 120 to execute the work S3 again.

When the work support device 100 detects the two CPU sockets 811 and 821 fixed to the substrate 800 as subjects in the work area A3 by the image data from the camera 101, it is determined that the work of the work S3 in the process Pi is ended, that is, the work of the process Pi is ended, "No" is recorded in the deviation 606 of the entry of the process Pi of the process management DB 600, and the detection time is recorded in the end time point 604 in the entry of the process Pi of the process management DB 600.

Predetermined Order of One Work

Next, the work S3 of the process Pi will be described as an example of the predetermined order of one work.

FIG. 13 is an explanatory diagram showing the predetermined order of the work S3 in the work area A3-1 in the process Pi. (1) to (6) is the predetermined order when the CPU socket pin 901 is fixed to the substrate 800. (0) shows a state of the work target before execution of the predetermined order (1) to (6), and (7) shows a state of the work target after the execution of the predetermined order (1) to (6). Although the CPU socket pin 901 is described as an example of the work target in FIG. 13, the same applies to the CPU socket pin 902.

(0) The CPU socket pin 901 and the socket cover 812 are attached to the substrate 800, and the screws 1101a to 1101d are not fastened to the screw holes 810a to 810d since it is in the state before (1). The worker 120 has not yet used the electric driver 103.

(1) The worker 120 inserts the screw 1101a into the lower right screw hole 810a, and tightens the screw 1101a by the electric driver 103. (2) The worker 120 inserts the screw 1101b into the upper left screw hole 810b positioned on a diagonal line of the screw hole 810a, and tightens the screw 1101b by the electric driver 103. (3) The worker 120 inserts the screw 1101c into the upper right screw hole 810c positioned to the right side of the screw hole 810b, and tightens the screw 1101c by the electric driver 103. (4) The worker 120 inserts the screw 1101d into the lower left screw hole 810d positioned on a diagonal line of the screw hole 810c, and tightens the screw 1101d by the electric driver 103.

(5) The worker 120 tightens the screw 1101a screwed into the lower right screw hole 810a by the electric driver 103. (6) The worker 120 tightens the screw 1101b screwed into the upper left screw hole 810b positioned on the diagonal line of the screw hole 810a by the electric driver 103. Accordingly, the work S3 in the work area A3-1 is ended. (7) This is a state in which the work S3 is ended.

The camera 101 images a series of works (0) to (7), and outputs image data to the work support device 100. The work support device 100 performs image recognition on the image data from the camera 101 and determines whether a deviation exists in the predetermined order (1) to (6). For example, in (2), when the worker 120 does not insert the screw 1101b into the screw hole 810b and the screw 1101c is inserted into the screw hole 810c and tightened by the electric driver 103, the work support device 100 determines that the work order has deviated. Then, the work support device 100 confirms that the worker 120 has restored to the state in which the state of (1) is ended, and determines again whether (2) is deviated.

Accordingly, for example, before the work of the above (1), the work support device 100 detects image data of the electric driver 103 in the work area A3-1, and after the work of the above (6), the image data of the electric driver 103 is not detected in the work area A3-1. The work by the worker 120, which is the start and end of the screw fastening, can be specified by time-series presence or absence of the electric driver 103 and the hand of the worker 120.

Examples of Output Screens

Next, examples of output screens displayed on the display 106 will be described with reference to FIGS. 14 to 17. The work support device 100 may transmit data of the output screens to another computer having the display 106, instead of the display 106.

FIG. 14 is an explanatory diagram showing an example of an output screen displaying the work order of the process Pi. An output screen 1400 is displayed on the display 106 when the work support device 100 specifies the end of a previous process Pi-1 by the worker 120 or when a first transition button 1403 indicating "next view" is selected on the output screen 1400 of the process Pi-1 by the work support device 100.

A first display area 1401 is a display area for displaying a character string of the current process Pi. The first display area 1401 may be an item selectable by the worker 120 by the input device 203. For example, when the worker 120 selects the first display area 1401 by the input device 203, the time point at which the first display area 1401 is selected may be recorded in the start time point 603 in the entry of the process Pi of the process management DB 600.

A second display area 1402 is a display area for displaying a work order of the works S1 to S3 of the current process Pi. The second display area 1402 includes a first item 1402a, a second item 1402b, and a third item 1402c selectable by the worker 120 by the input device 203. The first item 1402a indicates the work S1. The second item 1402b indicates the work S2. The third item 1402c indicates the work S3. The work support device 100 may highlight the item of the work Sj currently being performed. Accordingly, which work should be currently performed by the worker 120, that is, whether the work order has deviated can be grasped.

The first transition button 1403 is a button for transitioning to the output screen 1400 that displays the work order of the next process Pi+1. A second transition button 1404 is a button for transitioning to the output screen 1400 that displays the work order of the previous process Pi-1.

FIG. 15 is an explanatory diagram showing an example of an output screen displayed when the worker 120 selects the third item 1402c by the input device 203. An output screen 1500 displays the work order in the work S3 in a manner of a diagram, an image, or a moving image. Accordingly, the worker 120 can visually recognize the work order in the work S3. An end button 1501 is a button for closing the output screen 1500 when the worker 120 selects by the input device 203. Although the output screen 1500 displayed when the third item 1402c is selected has been described in FIG. 15, the work order of the work S1 or S2 is similarly displayed when the first item 1402a or the second item 1402b is selected.

FIG. 16 is an explanatory diagram showing an example of an output screen showing progress work detection. An output screen 1600 is a pop-up screen displayed when the work order is progressed. In the example of FIG. 16, the output screen 1600 is displayed when the progress (i.e., end) of the work S1 in the process Pi is detected. A transition button 1601 is a button that is selectable by the worker 120 by the input device 203. When the transition button 1601 is selected, the output screen 1600 is closed, the highlighting of the first item 1402a of the output screen 1400 is canceled, and the second item 1402b is highlighted.

FIG. 17 is an explanatory diagram showing an example of an output screen showing deviation work detection. An output screen 1700 is a pop-up screen displayed when the work order has deviated. In an example of FIG. 17, the output screen 1700 is displayed when the deviation of the work S3 in the process Pi is detected. A return button 1701 is a button that is selectable by the worker 120 by the input device 203. After the worker 120 returns to an original state before the deviation, the output screen 1700 is closed when the return button 1701 is selected.

Functional Configuration Example of Work Support Device 100

FIG. 18 is a block diagram showing the functional configuration example of the work support device 100. The work support device 100 includes the work target DB 300, the work sequence DB 400, the work area DB 500, the process management DB 600, an output screen DB 1810, a specifying unit 1801, a selection unit 1802, an identification unit 1803, a determination unit 1804, and an output unit 1805. The output screen DB 1810 stores screen data of the output screens 1400, 1500, 1600 and 1700 shown in FIGS. 14 to 17.

The work target DB 300, the work sequence DB 400, the work area DB 500, the process management DB 600, and the output screen DB 1810 are specifically stored in the storage device 202 shown in FIG. 2, for example. Specifically, the specifying unit 1801 to the output unit 1805 are implemented by, for example, causing the processor 201 to execute a program stored in the storage device 202.

The specifying unit 1801 is connected to various sensors 1800 such as the camera 101, the driver counter 102, the reading device 104, and the touch panel. The specifying unit 1801 specifies a target work to be performed by the worker 120 based on the work sequence DB 400. Specifically, for example, when one previous work is ended, the specifying unit 1801 specifies the next work as the target work to be performed by the worker 120.

More specifically, for example, when a determination result by the determination unit 1804 indicates the progress of the work order, when the work S1 in the process Pi is ended, the specifying unit 1801 specifies the next work S2 as a work to be performed by the worker 120 (hereinafter, target work Sj). When the determination result by the determination unit 1804 indicates the progress of the work order, when the work S3 in the process Pi is ended, the specifying unit 1801 specifies the first work S1 in the next process Pi+1 which is the next work as the target work Sj. When the process Pi is a final process Pn, the specifying unit 1801 does not specify the target work Sj since the first work S1 in the next process Pi+1 which is the next work does not exist.

The selection unit 1802 selects an area where the worker 120 performs the target work Sj specified by the specifying unit 1801 (hereinafter, referred to as a target work area Aj) based on the work area DB 500. Specifically, for example, the selection unit 1802 selects the target work area Aj corresponding to the target work Sj from the work area DB 500. For example, when the target work is the target work S1, the selection unit 1802 selects the work area A1, when the target work is the target work S2, the selection unit 1802 selects the work area A2, and when the target work is the target work S3, the selection unit 1802 selects the work area A3.

The identification unit 1803 identifies the work performed by the worker 120 based on the image data from the camera 101 that images the target work area Aj selected by the selection unit 1802. Specifically, for example, the identification unit 1803 controls an orientation and a focal distance of the camera 101 so as to be an angle of view including the target work area Aj. Specifically, for example, a ratio of the image data of the target work area Aj to an entire image area may be 90% or more. In addition, the identification unit 1803 extracts image data of an area corresponding to the target work area Aj from the image data from the camera 101. In this case, the camera 101 always captures an entire image represented by the plane coordinate 501 of the work table 107.

The identification unit 1803 generates a learning model by setting, for example, a combination of the image data 303 and the work target name 302 of the work target DB as training data, and applying the training data to a convolutional neural network. The identification unit 1803 specifies a work target in the image data by applying the image data being performed by the worker 120 to the learning model, and periodically identifies whether the worker 120 has performed the target work Sj in the target work area Aj from the combination of the specified work targets.

For example, in a case of the target work S1 and the target work area A1, the camera 101 captures an image of the target work area A1. In this case, if the worker 120 erroneously performs the work S2 in the work area A2, the work S1 is not imaged in the target work area A1. Therefore, the identification unit 1803 cannot identify the work performed in the target work area A1.

In a case of the target work S3 and the target work area A3, the camera 101 captures an image of the target work area A3. In this case, the identification unit 1803 identifies that the worker 120 screws the socket covers 812 and 822 to the substrate 800 by using the electric driver 103 and fixes the CPU socket pins 901 and 902 to the substrate 800.

When the determination result by the determination unit 1804 indicates the deviation of the work order, the identification unit 1803 refers to the image data from the camera 101 and identifies whether the work environment has been restored to the original state before the deviation. For example, in the process Pi, if the work S3 is performed even though the work S2 is to be performed following the work S1, the identification unit 1803 identifies whether the work target is restored to the state before the start of the work S2 (the state after the end of the work S1), as shown in FIG. 9, for example. When the image data indicates the state after the end of the work S1, the identification unit 1803 identifies that the work target has been restored.

When the predetermined order is wrong in the work S3 in the process Pi, the identification unit 1803 identifies whether the work target is restored to the state before the start of the work S3. For example, as shown in FIG. 13, after (1), when the worker 120 does not fasten the screw 1101b in the work (2) and fastens the screw 1101c as (3), the identification unit 1803 refers to the image data from the camera 101 and identifies whether the state is restored to the state before the work (2) (the state after the end of (1)). That is, the worker 120 has to remove the screw 1101c that is erroneously fastened. When the image data indicates the state after the end of (1), the identification unit 1803 identifies that the work target has been restored.

The determination unit 1804 determines whether the work identified by the identification unit 1803 is the target work Sj. Specifically, for example, if the identified work is the target work Sj, the determination unit 1804 determines that the work order has progressed (progress determination). Specifically, for example, as shown in FIG. 13, when the work S3 is performed in the order of (0) to (7) in the work area A3-1, the determination unit 1804 compares an identification result of (0) with an identification result of (1) according to the identification unit 1803, and it can be understood that the electric driver 103 has appeared in (1).

Since the position of the electric driver 103 transits according to the identification result of (1) to (6) according to the identification unit 1803, it can be understood that the work S3 is performed in the predetermined order. In addition, by comparing the identification result of (6) and the identification result of (7) according to the identification unit 1803, it can be understood that the electric driver 103 has disappeared in (7). Accordingly, it is possible to easily detect errors in the work order between works and errors in an order in one work by identifying the work in a time-series flow of appearance or disappearance of the tool in the target work area Aj and determining whether the work order has deviated.

If the identified work is not the target work Sj, the determination unit 1804 determines that the work order has deviated (deviation determination). For example, in the case of the target work area S1 and the target work area A1, when the identification result according to the identification unit 1803 is "failed to identify the work performed in the target work area A1" as described above, the determination unit 1804 determines that the work order has deviated (deviation determination). Accordingly, the determination unit 1804 can quickly determine the deviation of the work order since it is understood that the identification cannot be performed immediately after the start of the work S1. On the other hand, when the identification result by the identification unit 1803 is the same as the work S1, the determination unit 1804 determines that the work order has progressed.

For example, in the case of the target work area S3 and the target work area A3, when the identification result according to the identification unit 1803 is in accordance with the predetermined order (1) to (6) as shown in FIG. 13, the determination unit 1804 determines that the work order has progressed since the identification result is the work S3. On the other hand, when the identification result is not in accordance with the predetermined order (1) to (6), the determination unit 1804 determines that the work order has deviated.

Similar to the identification unit 1803, the determination unit 1804 periodically performs determination from the start of the work S3. Therefore, when the predetermined order is incorrect in the middle of the predetermined order although the work is performed at the beginning of the start of the work S3 according to the predetermined order, the determination unit 1804 can determine that the work order has deviated.

The output unit 1805 outputs the determination result by the determination unit 1804. Specifically, for example, the output unit 1805 displays output screens 1400, 1500, 1600 and 1700 on the display 106, as shown in FIGS. 14 to 17. Specifically, for example, when the determination result is a progress determination, the output unit 1805 displays the output screen 1600 shown in FIG. 16 on the display 106 as a subsequent work instruction. If the determination result is a deviation determination, the output unit 1805 displays the output screen 1700 shown in FIG. 17 on the display 106 as a deviation notification of the work order.

As described above, the output unit 1805 records work time from the start time point 603 to an end time point of the target process Pi including the target work Sj in the process management DB 600. Specifically, for example, the output unit 1805 records the start time point 603 at the start of the first target work S1 in the target process Pi, and records the end time point 604 at the end of the last target work S3.

When the target work Sj is not the final work S3 in the target process Pi, the output unit 1805 highlights the item of a subsequent work Sj+1 as the information that specifies the subsequent work Sj+1 of the target work Sj in FIG. 14. When the target work Sj is the final work in the target process Pi including the target work Sj, the output unit 1805 outputs the output screen 1400 as information that specifies a subsequent process Pi+1 of the target process Pi.

Example of Work Support Processing Procedure

FIG. 19 is a flowchart showing an example of a procedure of a work support processing performed by the work support device 100. The work support device 100 specifies the target process Pi and the target work Sj by the specifying unit 1801 (step S1901), and determines whether the final process Pn has ended (step S1902). When the process is not the final process Pn (step S1902: No), the work support device 100 selects the target work area by the selection unit 1802 (step S1903).

The work support device 100 identifies the work performed by the worker 120 by the identification unit 1803 (step S1904), and determines whether the work order is deviated by the identification result (step S1905). If the determination result is a deviation determination (step S1905: deviation), the work support device 100 outputs the output screen 1700 as a determination result by the output unit 1805 (step S1906). Then, the work support device 100 identifies whether the state before the target work Sj has been restored by the identification unit 1803 (step S1907). When the state has not been restored (step S1907: No), the process returns to step S1906. When the state has been restored (step S1907: Yes), the process returns to step S1904, and the work support device 100 identifies the work performed by the worker 120 after the restoration by the identification unit 1803 (step S1904).

If it is determined in step S1905 that the determination result is a progress determination (step S1905: progress), the work support device 100 outputs the output screen 1600 by the output unit 1805 (step S1908), and the processing returns to step S1901. When it is determined in step S1902 that the final process Pn has ended (step S1902: Yes), the work support device 100 ends the series of processing.

(1) Accordingly, the work support device 100 according to the present embodiment specifies the target work Sj to be performed by the worker 120 based on the work sequence DB 400, selects a target area Aj in which the specified target work Sj is to be performed by the worker 120 based on the work area DB 500, identifies the work performed by the worker 120 based on the image data from the camera 101 that captures an image of the selected target area Aj, determines whether the identified work is the target work, and outputs the determination result.

Therefore, by narrowing down an image recognition target of the camera 101 to the target work area Aj corresponding to the specified work Sj with reference to the assembly drawing information of the process Pi, an influence of variation in the feature amount due to the individual difference between workers 120 and an influence of variation in the feature amount due to a difference in behavior of each workday even if by the same worker 120 can be prevented. Therefore, it is possible to improve work identification accuracy.

(2) In the above (1), the work support device 100 may specify the target work Sj based on the determination result and the work sequence DB 400. Accordingly, the target work Sj can be specified by distinguishing a case where the determination result is a progress determination from a case where the determination result is a deviation determination. Therefore, accuracy of specifying the target work Sj can be improved.

(3-1) In the above (1), the work support device 100 controls the camera 101 in a manner that an imaging area of the camera 101 is the angle of view including the target work area Aj. Accordingly, by excluding the image data other than the target work area Aj as much as possible, image recognition accuracy of the work in the target work area Aj can be improved.

(3-2) In the above (1), the work support device 100 may extract the image data of the target work area Aj from the image data of all imaging areas and identify the work performed by the worker 120 based on the extracted image data. Accordingly, a mechanism for controlling the attitude of the camera 101 as shown in (3-1) is unnecessary and thereby the facility can be simplified.

(4) In the above (1), the work support device 100 identifies the work performed by the worker 120 based on the image data 303 of the tool included in the image data captured by the camera 101. Accordingly, the work using the tool and the work without using the tool can be identified and distinguished from each other.

(5) In the above (4), the tool includes the driver or the reading device 104. Accordingly, the work can be identified based on a type of the tool.

(6) In the above (1), the work support device 100 determines whether the worker 120 has deviated from the work order based on the time-series presence or absence of the tool in the identification result. Accordingly, it is possible to easily detect errors in the work order between works and errors in an order in one work by identifying the work in the time-series flow of the appearance or disappearance of the tool in the target work area Aj and determining whether the work order has deviated.

(7) In the above (6), whether the worker 120 has deviated from the work order is determined based on a time-series position of the tool in the identification result. Accordingly, it is possible to easily detect errors in the work order between works and errors in an order in one work by identifying the work in the time-series flow of the appearance or disappearance and position change of the tool in the target work area Aj and determining whether the work order has deviated.

(8) In the above (1), when the worker 120 does not deviate from the work order, the work support device 100 refers to the work sequence DB 400 and outputs the subsequent work instruction. Accordingly, it can be confirmed that the worker 120 has ended the target work Sj and is to be transitioned to the subsequent work Sj+1.

(9) In the above (8), the work support device 100 records the work time from the start time point 603 to the end time point of the target process Pi including the target work Sj in the process management DB 600. Accordingly, how much time has been taken for the process Pi can be confirmed.

(10) In the above (8), when the target work Sj is not the final work in the target process Pi including the target work Sj, the work support device 100 outputs information that specifies the subsequent work Sj+1 of the target work Sj as the subsequent work instruction. Accordingly, the worker 120 can confirm which work should be performed next.

(11) In the above (8), when the target work Sj is the final work in the target process Pi including the target work Sj, the work support device 100 outputs information that specifies the subsequent process Pi+1 of the target process Pi as the subsequent work instruction. Accordingly, the worker 120 can confirm which process should be performed next.

(12) In the above (1), when the worker 120 deviates from the work order, the work support device 100 outputs the deviation notification of the work order. Accordingly, the worker 120 can confirm whether the work order has deviated in a work unit.

(13) In the above (11), when the deviation notification is output, the work support device 100 identifies the work performed by the worker 120 after restoring to the state before the identified work based on the new image data of the target work area Aj captured by the camera 101. Accordingly, when the worker 120 deviates from the work order, appropriate work can be started again after being restored to the state before the deviation, and the worker 120 can be prompted to perform work in the work order.

The invention is not limited to the above embodiment and includes various modifications and equivalent configurations within the spirit of the claims. For example, the above embodiment has been described in detail in order to make the invention easy to understand, and the invention is not necessarily limited to those having all the configurations described. A part of a configuration of a certain embodiment may be replaced with a configuration of another embodiment. A configuration of another embodiment may be added to a configuration of a certain embodiment. Another configuration may be added to, subtracted from or replaced with a part of a configuration of each embodiment.

In addition, parts or all of the configurations, functions, processing units, processing methods and the like maybe implemented by hardware, for example, by designing with an integrated circuit, or may be implemented by software with a processor to interpret and execute a program that implements each function.

Information such as a program, a table, and a file that implements each function can be stored in a storage device such as a memory, a hard disk, and a solid state drive (SSD), or a recording medium such as an integrated circuit (IC) card, an SD card, and a digital versatile disc (DVD).

Control lines and information lines that are considered to be necessary for the description are shown, and not all the control lines and information lines that are necessary for mounting are shown. In practice, it may be considered that almost all the configurations are connected to each other.

REFERENCE SIGN LIST 1810 output screen DB
300 work target DB
400 work sequence DB
500 work area DB
600 process management DB
100 work support device
101 camera
102 driver counter
103 electric driver
104 reading device
105 keyboard
106 display
107 work table
108 work shelf
120 worker
1801 specifying unit
1802 selection unit
1803 identification unit
1804 determination unit
1805 output unit

The invention claimed is:

1. A work support device comprising:
a processor that executes a program; and
a storage device that stores the program, wherein
the storage device or another storage device accessible by the work support device stores information indicating a work order for a plurality of processes, and information indicating a work area of a worker for work in each process of the plurality of processes, and
the program configures the processor to execute:
a specifying processing in which a target work to be performed by the worker is specified based on the information indicating the work order,
a selection processing in which a target area where the target work specified by the specifying processing to be performed by the worker is selected based on the information indicating the work area, wherein the selection processing accesses a work area database that stores work area information for a plurality of distinct work areas specified according to a planar coordinate system on a work table, wherein a first work area is specified on the work table in a first area of the planar coordinate system for a first work of a process of the plurality of processes to be performed by the worker on the work table, wherein a separate second work area is specified on the work table in a second area of the planar coordinate system for a second work of the process to be performed by the worker in the second work area on the work table following the first work,
an identification processing in which respective works performed by the worker are identified based on image data from a camera that captures images of respective work areas selected by the selection processing, the camera capturing images of the first work performed by the worker in the first work area specified on the work table in the first area of the planar coordinate system when the first work area is selected, and capturing images of the second work performed by the worker in the second work area specified on the work table in the second area of the planar coordinate system when the second work area is selected,
a determination processing in which whether the worker has deviated from the work order is determined based on an identification result by the identification processing, and
an output processing in which a determination result by the determination processing is output.

2. The work support device according to claim 1, wherein in the specifying processing, the processor specifies the target work based on the determination result and the information indicating the work order.

3. The work support device according to claim 1, wherein in the identification processing, the processor extracts image data of the target area from the image data, and identifies the work performed by the worker based on the extracted image data.

4. The work support device according to claim 1, wherein the storage device stores image data for each tool used by the worker in the work, and
in the identification processing, the processor identifies the work performed by the worker based on image data of a tool included in the image data.

5. The work support device according to claim 4, wherein the tool includes a driver or a reading device.

6. The work support device according to claim 1, wherein the storage device or the other storage device stores image data for each tool used by the worker in the work, and
in the determination processing, the processor determines whether the worker has deviated from the work order based on time-series presence or absence of the tool in the identification result.

7. The work support device according to claim 6, wherein
in the determination processing, the processor determines whether the worker has deviated from the work order based on a time-series position of the tool in the identification result.

8. The work support device according to claim 1, wherein
in the output processing, when the worker does not deviate from the work order, the processor refers to the information indicating the work order and outputs a subsequent work instruction.

9. The work support device according to claim 8, wherein
in the output processing, the processor records a work time from a start time point to an end time point of a target process including the target work in the storage device or the other storage device.

10. The work support device according to claim 8, wherein
in the output processing, the processor outputs information that specifies a subsequent work of the target work as the subsequent work instruction when the target work is not a final work in a target process including the target work.

11. The work support device according to claim 8, wherein
in the output processing, the processor outputs information that specifies a subsequent process of a target process including the target work as the subsequent work instruction when the target work is a final work in the target process.

12. The work support device according to claim 1, wherein
in the output processing, when the worker has deviated from the work order, the processor outputs a deviation notification of the work order.

13. The work support device according to claim 12, wherein
in the identification processing, when the deviation notification is output, the processor identifies the work performed by the worker after being restored to a state before the identified work based on new image data of the target area captured by the camera.

14. A work support method which is executed by a work support device including a processor that executes a program and a storage device that stores the program, wherein
the storage device or another storage device accessible by the work support device stores information indicating a work order for a plurality of processes, and information indicating a work area of a worker for work in each process of the plurality of processes, and
the program configures the processor to execute:
a specifying processing in which a target work to be performed by the worker is specified based on the information indicating the work order,
a selection processing in which a target area where the target work specified by the specifying processing to be performed by the worker is selected based on the information indicating the work area, wherein the selection processing accesses a work area database that stores work area information for a plurality of distinct work areas specified according to a planar coordinate system on a work table, wherein a first work area is specified on the work table in a first area of the planar coordinate system for a first work of a process of the plurality of processes to be performed by the worker on the work table, wherein a separate second work area is specified on the work table in a second area of the planar coordinate system for a second work of the process to be performed by the worker in the second work area on the work table following the first work,
an identification processing in which respective works performed by the workers are identified based on image data from a camera that captures images of respective work areas selected by the selection processing, the camera capturing images of the first work performed by the worker in the first work area specified on the work table in the first area of the planar coordinate system when the first work area is selected, and capturing images of the second work performed by the worker in the second work area specified on the work table in the second area of the planar coordinate system when the second work area is selected,
a determination processing in which whether the worker has deviated from the work order is determined based on an identification result by the identification processing, and
an output processing in which a determination result by the determination processing is output.

15. A non-transitory storage device storing a program that causes a processor in communication with the storage device to execute work support, wherein
the storage device stores information indicating a work order for each process, and information indicating a work area of a worker for each work in the process, and
the program configures the processor to execute:
a specifying processing in which a target work to be performed by the worker is specified based on the information indicating the work order,
a selection processing in which a target area where the target work specified by the specifying processing to be performed by the worker is selected based on the information indicating the work area, wherein the selection processing accesses a work area database that stores work area information for a plurality of distinct work areas specified according to a planar coordinate system on a work table, wherein a first work area is specified on the work table in a first area of the planar coordinate system for a first work of a process of the plurality of processes to be performed by the worker on the work table, wherein a separate second work area is specified on the work table in a second area of the planar coordinate system for a second work of the process to be performed by the worker in the second work area on the work table following the first work,
an identification processing in which respective works performed by the worker are identified based on image data from a camera that captures images of respective work areas selected by the selection processing, the camera capturing images of the first work performed by the worker in the first work area specified on the work table in the first area of the planar coordinate system when the first work area is selected, and capturing images of the second work performed by the worker in the second work area specified on the work table in the second area of the planar coordinate system when the second work area is selected,
a determination processing in which whether the worker has deviated from the work order is determined based on an identification result by the identification processing, and an output processing in which a determination result by the determination processing is output.

* * * * *